(12) United States Patent
Adelman et al.

(10) Patent No.: US 7,996,512 B2
(45) Date of Patent: *Aug. 9, 2011

(54) DIGITAL IDENTITY REGISTRATION

(75) Inventors: Warren Adelman, Scottsdale, AZ (US); Michael Chadwick, Chandler, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,725

(22) Filed: May 17, 2010

(65) Prior Publication Data

US 2010/0223251 A1 Sep. 2, 2010

Related U.S. Application Data

(63) Continuation of application No. 11/746,484, filed on May 9, 2007, now Pat. No. 7,797,413, and a continuation of application No. 11/746,505, filed on May 9, 2007, and a continuation of application No. 11/746,522, filed on May 9, 2007.

(51) Int. Cl.
 *G06F 15/173* (2006.01)
(52) U.S. Cl. .. 709/223; 709/245; 709/226; 707/999.001
(58) Field of Classification Search ............... 709/223, 709/206, 203, 245, 226; 713/170, 172; 707/999.001
See application file for complete search history.

(56) References Cited

U.S. PATENT DOCUMENTS

| | | | |
|---|---|---|---|
| 6,085,242 A | 7/2000 | Chandra | |
| 6,332,158 B1 | 12/2001 | Risley et al. | |
| 6,560,634 B1 | 5/2003 | Broadhurst | |
| 6,725,269 B1 | 4/2004 | Megiddo | |
| 6,745,248 B1 | 6/2004 | Gardos et al. | |
| 6,856,963 B1 | 2/2005 | Hurwitz | |
| 6,880,007 B1 | 4/2005 | Gardos | |
| 7,072,944 B2 | 7/2006 | Ladonde et al. | |
| 7,350,229 B1 | 3/2008 | Lander | |
| 7,356,837 B2 | 4/2008 | Asghari-Kamrani et al. | |
| 7,437,558 B2 * | 10/2008 | Fenton et al. | 713/170 |
| 7,523,310 B2 * | 4/2009 | Narin et al. | 713/172 |
| 7,606,858 B2 * | 10/2009 | King et al. | 709/203 |
| 7,797,413 B2 * | 9/2010 | Adelman et al. | 709/223 |
| 2001/0021931 A1 | 9/2001 | Vaughan | |

(Continued)

OTHER PUBLICATIONS

May 12, 2010 reply to Mar. 23, 2010 Office Action in related U.S. Appl. No. 11/746,522.

(Continued)

*Primary Examiner* — Jungwon Chang
(74) *Attorney, Agent, or Firm* — Karl A. Fazio

(57) ABSTRACT

Systems and processes of the present invention allow for digital identity registration. In an example embodiment, a Registrant may access a website to enter a requested digital identity and registration information. The requested digital identity may comprise a piece of client software, a digital certificate, or a URL comprising any combination of characters—perhaps including a domain name that may be owned by the Registrant. A Digital Identity Database may then be searched to determine the availability of the requested digital identity. If the requested digital identity includes a domain name, WHOIS records may be searched to determine whether the Registrant owns and/or controls the domain name. The Registrant's registration information also may be validated. The requested digital identity may then be registered to the Registrant, possibly by adding the requested digital identity to the Digital Identity Database and/or adding the registration information to a Records database.

24 Claims, 14 Drawing Sheets

U.S. PATENT DOCUMENTS

| | | |
|---|---|---|
| 2001/0025342 A1 | 9/2001 | Uchida |
| 2002/0026439 A1 | 2/2002 | Monroe |
| 2002/0065903 A1 | 5/2002 | Fellman |
| 2002/0091703 A1 | 7/2002 | Bayles |
| 2002/0091827 A1 | 7/2002 | King |
| 2002/0129013 A1 | 9/2002 | Thomas |
| 2003/0115475 A1 | 6/2003 | Russo et al. |
| 2003/0177274 A1 | 9/2003 | Sun |
| 2003/0182573 A1 | 9/2003 | Toneguzzo et al. |
| 2004/0073691 A1 | 4/2004 | Sun |
| 2004/0162786 A1 | 8/2004 | Cross et al. |
| 2004/0169678 A1 | 9/2004 | Oliver |
| 2004/0177120 A1* | 9/2004 | Kirsch .................. 709/206 |
| 2004/0199520 A1 | 10/2004 | Ruiz |
| 2005/0044423 A1 | 2/2005 | Mellmer et al. |
| 2005/0071741 A1 | 3/2005 | Acharya et al. |
| 2006/0004784 A1 | 1/2006 | Ableman |
| 2006/0005009 A1* | 1/2006 | Ball et al. .................. 713/155 |
| 2006/0009994 A1 | 1/2006 | Hogg et al. |
| 2006/0015472 A1 | 1/2006 | Ahlander et al. |
| 2006/0015722 A1 | 1/2006 | Rowan et al. |
| 2006/0031314 A1* | 2/2006 | Brahms et al. .............. 709/206 |
| 2006/0031319 A1* | 2/2006 | Nelson et al. ............... 709/206 |
| 2006/0069697 A1 | 3/2006 | Shraim et al. |
| 2006/0106793 A1 | 5/2006 | Liang |
| 2006/0206572 A1 | 9/2006 | Ladonde et al. |
| 2006/0230039 A1 | 10/2006 | Shull et al. |
| 2006/0235824 A1 | 10/2006 | Cheung et al. |
| 2006/0253583 A1 | 11/2006 | Dixon |
| 2006/0271668 A1 | 11/2006 | Parsons et al. |
| 2007/0204168 A1 | 8/2007 | Cameron et al. |
| 2007/0294431 A1 | 12/2007 | Adelman et al. |
| 2009/0013182 A1 | 1/2009 | Asghari-Kamrani et al. |
| 2009/0094379 A1 | 4/2009 | Lu et al. |

OTHER PUBLICATIONS

Mar. 23, 2010 Office Action in related U.S. Appl. No. 11/746,522.
Josang et al., "User Centric Identity Management," 2005, The University of Queensland.
Apr. 14, 2010 non-final office action in related U.S. Appl. No. 11/746,484.
Apr. 14, 2010 response to Apr. 14, 2010 non-final office action in related U.S. Appl. No. 11/746,484.
Oct. 6, 2009 Office Action in related U.S. Appl. No. 11/746,522.
Applicant's Dec. 2, 2009 Reply to Oct. 6, 2009 Office Action in related U.S. Appl. No. 11/746,522.
Feb. 27, 2009 Office Action in related U.S. Appl. No. 10/977,373.
Applicant's Mar. 18, 2009 Reply to Feb. 27, 2009 Office Action in related U.S. Appl. No. 10/977,373.
May 14, 2009 Office Action in related U.S. Appl. No. 10/977,373.
Applicant's Nov. 13, 2009 Reply to May 14, 2009 Office Action in related U.S. Appl. No. 10/977,373.
Feb. 27, 2007 Office Action in related U.S. Appl. No. 11/976,834.
Applicant's Mar. 23, 2007 Reply Feb. 27, 2007 Office Action in related U.S. Appl. No. 11/976,834.
May 16, 2007 Office Action in related U.S. Appl. No. 11/976,834.
Applicant's Jun. 21, 2007 Reply Office Action in related U.S. Appl. No. 11/976,834.
Aug. 9, 2007 Office Action in related U.S. Appl. No. 11/976,834.
Applicant's Nov. 30, 2007 Reply to Aug. 9, 2007 Office Action in related U.S. Appl. No. 11/976,834.
Applicant's Nov. 30, 2009 Reply to Aug. 9, 2007 Office Action in related U.S. Appl. No. 11/976,834.
Dec. 26, 2007 Advisory Action in related U.S. Appl. No. 11/976,834.
Jan. 4, 2008 Request for Continued Examination in related U.S. Appl. No. 11/976,834.
May 15, 2008 Office Action in related U.S. Appl. No. 11/976,834.
Applicant's Aug. 28, 2008 Reply to May 15, 2008 Office Action in related U.S. Appl. No. 11/976,834.
Dec. 10, 2008 Office Action in related U.S. Appl. No. 11/976,834.
Applicant's Apr. 28, 2009 Reply to Dec. 10, 2008 Office Action in related U.S. Appl. No. 11/976,834.
Jul. 9, 2009 Office Action in related U.S. Appl. No. 11/976,834.
Feb. 28, 2007 Office Action in related U.S. Appl. No. 11/976,547.
Applicant's Apr. 10, 2007 Reply to Feb. 28, 2007 Office Action in related U.S. Appl. No. 11/976,547.
Jun. 5, 2007 Office Action in related U.S. Appl. No. 11/976,547.
Applicant's Jun. 29, 2007 Reply to Jun. 5, 2007 Office Action in related U.S. Appl. No. 11/976,547.
Jul. 9, 2007 Advisory Action in related U.S. Appl. No. 11/976,547.
Jul. 27, 2007 Request for continued Examination in related U.S. Appl. No. 11/976,547.
Sep. 7, 2007 Office Action in related U.S. Appl. No. 11/976,547.
Applicant's Jan. 3, 2008 Reply to Sep. 7, 2007 Office Action in related U.S. Appl. No. 11/976,547.
Mar. 27, 2008 Office Action in related U.S. Appl. No. 11/976,547.
Applicant's Aug. 13, 2008 Reply to Mar. 27, 2008 Office Action in related U.S. Appl. No. 11/976,547.
Oct. 21, 2008 Office Action in related U.S. Appl. No. 11/976,547.
Apr. 9, 2009 Pre-Appeal Brief Conference Request in related U.S. Appl. No. 11/976,547.
Apr. 16, 2009 Pre-Appeal Brief Conference Decision in related U.S. Appl. No. 11/976,547.
Jun. 5, 2009 Appeal Brief in related U.S. Appl. No. 11/976,547.
Oct. 16, 2009 Appeal Brief in related U.S. Appl. No. 11/976,547.
Google SafeSearch Filtering (http://web.archive.org/web/20030702191745/http://www.google.com/intl/en/help/customize.html), Jul. 2003, WaybackMachine.
Golbeck and Hendler. Reputation Network Analysis for Email Filtering. http://www.ceas.cc/papers-2004/177.pdf. Jul. 2004.
Sep. 27, 2010 reply to Aug. 17, 2010 Office Action in related U.S. Appl. No. 11/746,505.
Aug. 17, 2010 Office Action in related U.S. Appl. No. 11/746,505.
Sep. 27, 2010 reply to Aug. 4, 2010 Office Action in related U.S. Appl. No. 11/746,522.
Aug. 4, 2010 Office Action in related U.S. Appl. No. 11/746,522.
Feb. 8, 2011 reply to Dec. 9, 2010 Office Action in related U.S. Appl. No. 11/746,505.
Dec. 9, 2010 Office Action in related U.S. Appl. No. 11/746,505.
Feb. 25, 2011 Office Action in related U.S. Appl. No. 11/746,505.
Apr. 21, 2011 reply to Feb. 25, 2011 Office Action in related U.S. Appl. No. 11/746,505.
Dec. 12, 2010 Office Action in related U.S. Appl. No. 11/746,522.
Applicant's Feb. 7, 2011 Appeal Brief in related U.S. Appl. No. 11/746,522.
Examiner's Apr. 21, 2011 Answer Brief in related U.S. Appl. No. 11/746,522.
May 26, 2010 reply to Mar. 31, 2010 Office Action in related U.S. Appl. No. 11/746,505.
Mar. 31, 2010 Office Action in related U.S. Appl. No. 11/746,505.
May 18, 2010 Notice of Allowance in related U.S. Appl. No. 11/746,484.

* cited by examiner

DIGITAL IDENTITY REGISTRATION

CROSS REFERENCE TO RELATED PATENT APPLICATIONS

This patent application is a continuation of the following previously-filed patent applications, priority from which is hereby claimed: U.S. patent application Ser. No. 11/746,484 to Adelman et. al., with filing date May 9, 2007 and titled "DIGITAL IDENTITY REGISTRATION;" U.S. patent application Ser. No. 11/746,505 to Adelman et. al. with filing date May 9, 2007 and titled "DIGITAL IDENTITY VALIDATION;" and U.S. patent application Ser. No. 11/746,522 to Adelman et. al. with filing date May 9, 2007 and titled "DIGITAL IDENTITY RELATED REPUTATION TRACKING AND PUBLISHING," each of which were continuations-in-part of the following previously-filed patent applications: U.S. patent application Ser. No. 10/977,373 to Adelman et. al., with filing date Oct. 29, 2004 and titled "TRACKING DOMAIN NAME RELATED REPUTATION;" U.S. patent application Ser. No. 10/976,834 to Adelman et. al. with filing date Oct. 29, 2004 and titled "PUBLISHING DOMAIN NAME RELATED REPUTATION IN WHOIS RECORDS;" and U.S. patent application Ser. No. 10/976,547 to Adelman et. al. with filing date Oct. 29, 2004 and titled "PRESENTING SEARCH ENGINE RESULTS BASED ON DOMAIN NAME RELATED REPUTATION." This patent application also is related to U.S. patent application Ser. No. 12/482,297 to Adelman et. al. with filing date Jun. 10, 2009 and titled "TRACKING DIGITAL IDENTITY RELATED REPUTATION DATA;" and U.S. patent application Ser. No. 12/482,306 to Adelman et. al. with filing date Jun. 10, 2009 and titled "ACCESSING DIGITAL IDENTITY RELATED REPUTATION DATA." The subject matter of all referenced patent applications is commonly owned and assigned to The Go Daddy Group, Inc. All prior applications are incorporated herein in their entirety by reference.

FIELD OF THE INVENTION

The present inventions relate generally to managing Internet digital identities and, more specifically, systems and methods for registering digital identities, validating digital identity origin and ownership, and tracking and publishing digital identity related reputation data.

BACKGROUND OF THE INVENTION

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding webpages on the Internet is generally known as the World Wide Web (WWW) or simply the Web.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or NETSCAPE NAVIGATOR. After the browser has located the desired webpage, it requests and receives information from the webpage, typically in the form of an HTML document, and then displays the webpage content for the user. The user may then view other webpages at the same website or move to an entirely different website using the browser.

Browsers are able to locate specific websites because each website on the Internet has a unique Internet Protocol (IP) address. Each IP address is a 32 bit binary number, but is typically shown in dotted decimal notion (i.e. —192.145.68.112) to improve human readability. IP addresses, however, even in dotted decimal notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's internet address, also known as the website's domain name. An example of a URL with a HTTP request and domain name is: http://www.companyname.com. In this example, the "http" identifies the URL as a HTTP request and the "companyname.com" is the domain name.

Individuals, companies, and other entities that provide content on the web generally want to use their name or one of their trademarks as part of their domain name. Thus, domain names are generally company trademarks, personal names, or short phrases concatenated with a top level domain name (TLD) extension (e.g. .com, .net, .org, .biz, .us, .cc, .ws, .de, etc.). TLD extensions can be divided into two groups. The first group is known as generic Top-Level Domains (gTLD) and the second group is country code TLDs (ccTLD). Examples of gTLDs include .com, .net, .org, .biz, etc. Examples of current ccTLDs include .us for the United States, .uk and .gb for United Kingdom, .ca for Canada, .de for Germany, .jp for Japan, etc. Most gTLDs are organized through a central domain name Shared Registration System (SRS) based on their TLD.

The process for registering a domain name with .com, .net, .org and some other TLDs allows an Internet user to use an ICANN-accredited Registrar to register their domain name. For example, if an Internet user, John Doe, wishes to register the domain name "mycompany.com," John Doe may initially determine whether the desired domain name is available by contacting a domain name Registrar. The Internet user may make this contact using the Registrar's webpage and typing the desired domain name into a field on the Registrar's webpage created for this purpose. Upon receiving the request from the Internet user, the Registrar may ascertain whether "mycompany.com" has already been registered by checking the SRS database associated with the TLD of the domain name. The results of the search may then be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

An individual or entities' domain name is increasingly the anchor around which their online presence is maintained. For example, a company's website (www.companyname.com) and email system (john.doe@companyname.com) utilize the company's domain name as an integral part of their architecture.

For Internet users and businesses alike, the Internet continues to be increasingly valuable. More people are using the Web for everyday tasks, from shopping, banking, and paying bills to consuming media and entertainment. E-commerce is growing, with businesses delivering more services and content across the Internet, communicating and collaborating online, and inventing new ways to connect with each other.

Websites allow individuals and businesses to share their information with a large number of Internet users. Many products and services are offered for sale on the Internet, thus elevating the Internet to an essential tool of commerce. Internet businesses, whether a large corporation or an individual, are rapidly creating websites to take advantage of the growing number of customers using the Internet and customers' increasing willingness to purchase goods and services over the Web. Websites created by Internet businesses may be reached by millions of Internet savvy customers, thereby allowing Internet businesses to offer their products and services to a very large pool of potential customers.

Some Internet business websites, typically those that receive or share sensitive information (i.e. —those associated with banks, credit card companies, online businesses, social organizations, etc.) may require Internet users to login to the website with a secure username and password before accessing the website's content.

The username/password system is a common form of secret authentication data used to control website access. The username/password is kept secret from those not allowed access. Those wishing to gain access are tested on whether or not they have a valid (recognized) username and whether they know the associated password. Internet users are granted or denied access to websites accordingly.

Many websites have different rules governing the creation of usernames and passwords. Some require passwords that include a complex combination of letters, numbers, and other characters. Others have no restrictions whatsoever.

With the proliferation of login-access websites, Internet users often must remember dozens (or more) different username/password combinations, one for each secure website they wish to access. This has resulted in what has come to be known as "password fatigue."

Partly in response to this perceived problem, the concept of the "digital identity" has evolved. A digital identity is a set of characteristics by which a person or thing is recognizable or distinguished in the digital realm. Digital identity allows for the electronic recognition of an individual or thing without confusing it for someone or something else.

There are many applications for an Internet user's digital identity, including authenticating the user before permitting access to a website. One method for such authentication includes the use of a URL (i.e. —OPENID) that may or may not interact with a piece of client software (i.e. —MICROSOFT WINDOWS CARDSPACE).

URL-based digital identity systems (such as OPENID) utilize a framework based on the concept that any individual or entity can identify themselves on the Internet with a URL provided by a Digital Identity Provider (i.e. —johndoe.openid.com). The Digital Identity Provider maintains an Identity Server on which a Digital Identity Database (a database of provided digital identity URLs and the corresponding authentication passwords) is stored. Once obtained, the Internet user may utilize their digital identity URL to access various websites. For example, to login to an OPENID-enabled website, the user enters their digital identity URL in the username box. The user is then momentarily redirected to the user's Digital Identity Provider's website (or an authentication window appears) to login using whatever password they have set up with their Digital Identity Provider. Once authenticated, the Digital Identity Provider sends the participating website an encrypted message (a token) confirming the identity of the person logging in.

Client-software-based digital identity systems (such as MICROSOFT WINDOWS CARDSPACE) utilize a piece of client software that enables Internet users to securely provide their digital identity to online services. CARDSPACE, for example, is a framework developed by MICROSOFT that securely stores an individual or entities' digital identity and provides an interface for choosing the appropriate digital identity for a particular transaction, such as logging into a website. When a CARDSPACE user's browser opens a password-protected website, CARDSPACE pops up a security-hardened user interface with a set of "cards" for the user to choose from. Each card has some identity data associated with it. When the user chooses a card, a request in the form of a web service call goes to the Digital Identity Provider, and a signed and encrypted security token is returned containing the required information (i.e. —credit limit, employer's name and address, or perhaps a social security number). The user then decides whether to release this information to the requesting online service. If the user approves, the token is sent on to the website where the token is processed and the user is authenticated.

In February 2007, MICROSOFT announced that it will collaborate with other companies on interoperability between OPENID and CARD SPACE as digital identity technologies.

There are currently numerous Digital Identity Providers offering URL-based (OPENID) digital identity services, meaning they offer digital identity URLs and servers to authenticate them.

Applicants have noticed that these services, however, require that a Registrant's digital identity be hosted on the Digital Identity Provider's servers. This has resulted in digital identity URLs that necessarily incorporate the Digital Identity Provider's domain name (i.e. —johndoe.myopenid.com, johndoe.pip.verisignlabs.com, johndoe.videntity.com, or getopenid.com/johndoe). An Internet user who wishes to own a domain name and obtain a digital identity URL must therefore separately register their domain name and digital identity though different entities (a domain name Registrar and a Digital Identity Provider). This results in the domain name and the digital identity URL being hosted by different entities on different servers and the inability of the Internet user to easily utilize his domain name in his digital identity URL. This precludes the Internet user from having a streamlined set of e-commerce tools (i.e. —email address, website address, and digital identity URL) based on his domain name.

Irrespective of the digital identity platform utilized (WINDOWS CARDSPACE, OPENID, or other—perhaps undeveloped—technologies), there are numerous other ways (aside from website user authentication) in which an Internet user's digital identity may be utilized.

For example, an Internet user may wish to participate in an online social network or dating service, offer an item or service for online sale, or post a comment or opinion on a website. For each of these applications, the Internet user may be identified by their digital identity.

It would be useful to a Requester (including those deciding whether to interact online with the Internet user) if, before choosing to interact, the Requestor could obtain, review, and assess digital identity related reputation data, including, but not limited to, reputation of the digital identity itself or reputation of a person, entity, user, registrant, URL, domain name, email address, or website associated with the digital identity.

The Requestor could then decide whether to interact with the Internet user based upon the digital identity related reputation data with the Subject.

Conversely, it would be useful to a Subject (i.e. —the individual or entity to whom a digital identity is registered) to have a favorable reputation rating made available to Internet users. The favorable rating would encourage Internet users to engage in online social, e-commerce, or other activities with the Subject.

Unfortunately, malevolent Internet users may be motivated to defraud digital identity related reputation systems. For example, an individual may fraudulently register a digital identity and take steps to cause a negative reputation rating for the digital identity or an individual, entity, domain name, email address, or website fraudulently associated with the digital identity. Malware also could be developed to simulate a valid digital identity for the purpose of tarnishing the digital identity's reputation.

Applicants have noticed that presently-existing Digital Identity Providers offer no digital identity validation process allowing digital identity users to prove that they are the true, correct, and legal originator of their digital identity.

Even a validated digital identity registrant, however, may abuse the Internet. Among such abuses are phishing, pharming, spamming, or posting illegal content on a website (i.e. —child pornography).

Phishing is the luring of sensitive information, such as passwords, credit card numbers, bank accounts, or other personal information, from an Internet user by masquerading as someone trustworthy with a legitimate need for such information. Pharming is a hacker's attack aiming to redirect a website's traffic to another (bogus) website. Pharming can be conducted either by changing the hosts file on a victim's computer or by exploitation of a vulnerability in DNS server software. Spam or unsolicited email is flooding the Internet with many copies of the identical or nearly identical message, in an attempt to force the message on people who would not otherwise choose to receive it. Most spam is commercial advertising, often for dubious products, get-rich-quick schemes, or quasi-legal services.

Applicants are unaware of any system or method for tracking or publishing digital identity related reputation for such Internet use or abuse (either positive or negative).

In response to the concerns discussed above, there is a need for better systems and methods for registering digital identities, validating digital identity origin and ownership, and tracking and publishing digital identity related reputation data.

SUMMARY OF THE INVENTION

The limitations cited above and others are substantially overcome through the systems and methods disclosed herein. The systems and methods of the present inventions allow for more efficient registration of digital identities, validation of digital identity origin and ownership, and tracking and publication of digital identity related reputation data.

Certain embodiments of the present inventions take advantage of the unique role of Digital Identity Providers who are also domain name Registries or domain name Registrars, which have access to information that other parties do not. This includes client contact information, billing records, complaints against clients, etc. If the Digital Identity Provider is also a PKI (public key infrastructure) certification authority, it has access to an even wider range of information obtained through a verification process of its clients.

An example embodiment of a digital identity registration system includes means for receiving a requested digital identity from a prospective Registrant, means for searching a Digital Identity Database for the availability of the digital identity, means for registering, if available, the digital identity to the Registrant, and means for updating the Digital Identity Database to indicate a change in the digital identity's registration status. If the digital identity comprises a URL that contains a domain name, the system may further comprise means for confirming whether the domain name is owned by the Registrant. If the domain name is available, the system may further comprise means for offering the domain name for sale and registration. The system also may comprise means for receiving digital identity registration information from the Registrant and means for validating the registration information before registering the digital identity. If validated, a Validation Marker may be provided to the Registrant.

In an exemplary process, a requested digital identity is received from a Registrant. The Digital Identity Database is then searched to determine the availability of the requested digital identity. If available, the requested digital identity is then registered to the Registrant and the Digital Identity Database is updated to indicate the registration. If the digital identity comprises a URL that contains a domain name, the process may confirm whether the Registrant owns or controls the domain name, for example by searching WHOIS records. The process also may receive registration information from the Registrant and validate the registration information from the Registrant prior to registering the requested digital identity.

An example embodiment of a digital identity validation system includes means for registering a digital identity to a Registrant, a Records Database for storing registration related records, and means for verifying certain information in the records. A Digital Identity Provider may maintain the database. The information to be verified may include information regarding a Registrant or other person or entity associated with the digital identity. The information also may include name, address, phone number, email address, website, URL, or other information. The verification means may contact a Registrant, administrative contact, technical contact, or another contact to confirm at least some information in the records. If the information is verified, a Validation Marker may be provided to the Registrant indicating that the digital identity has been validated. The Validation Marker may be a displayable image, a certificate for display on a webpage, a change in appearance for the digital identity, or an audible sound.

In an exemplary process, a digital identity is registered to a Registrant. During the registration process, one or more registration records are collected from the Registrant. The registration records may include information regarding a digital identity, its Registrant, or another person or entity associated with the digital identity. It also may include name, address, phone number, email address, website, URL, or other information. The information is then verified. As a non-limiting example, the information may be verified by contacting a Registrant, administrative contact, technical contact, or another contact to confirm at least some information in the records. If the information is verified, the Digital Identity Provider may provide the Registrant with a Validation Marker indicating that the digital identity has been validated. Among other things, a Validation Marker may be in the form of a displayable image, perhaps a digital certificate for display on a webpage, a change in appearance of the digital identity when it appears on a computer screen, or an audible sound.

An example embodiment of a system for tracking and publishing digital identity related reputation data includes a Digital Identity Provider that maintains a Digital Identity Database for storing a Plurality of Digital Identities and a Reputation Database for storing digital identity related reputation data for one or more digital identities. Reputation data may be tracked regarding the digital identity itself, URLs or domain names associated with the digital identity, digital identity purchasers or registrants (whether individuals or entities), or email addresses or websites associated with the digital identity. The reputation data may include ratings for various categories, such as email practices, website content, privacy policies and practices, fraudulent activities, domain name related complaints, overall reputation, etc. The Digital Identity Provider may update reputation data based on a variety of events related to the digital identity. When a Requestor is exposed to a digital identity online (i.e. —on a blog, social or dating website, or online sales or auction service), the Requestor may choose to review and assess digital identity related reputation data before opting to further interact with the digital identity. An embodiment of the present invention allows a Requestor to access a Reputation Database to review digital identity related reputation data before making this decision.

If a Registrant's digital identity incorporates a domain name, the Digital Identity Provider or another party may publish digital identity related reputation data in the WHOIS records. Reputation ratings or values may be published in the WHOIS records of the domain name linked to the digital identity. Alternatively, links or references to a location of the reputation ratings or values may be published in the WHOIS, such links or references may include a URL link, a DNS address, an IP address, a computer port, or any combination thereof. Reputation ratings or values also may be published by the Digital Identity Provider or another party via any means of publication available including, but not limited to, an accessible database, a website, other electronic storage, or printed media. One embodiment of the method for publishing the domain name related reputation data in the WHOIS records includes the following steps, the Digital Identity Provider collects digital identity related information and forms digital identity related reputation data. Then, the Digital Identity Provider stores the digital identity related reputation data in the WHOIS records.

The above features and advantages of the present invention will be better understood from the following detailed description taken in conjunction with the accompanying drawings.

DETAILED DESCRIPTION

Figure 1:
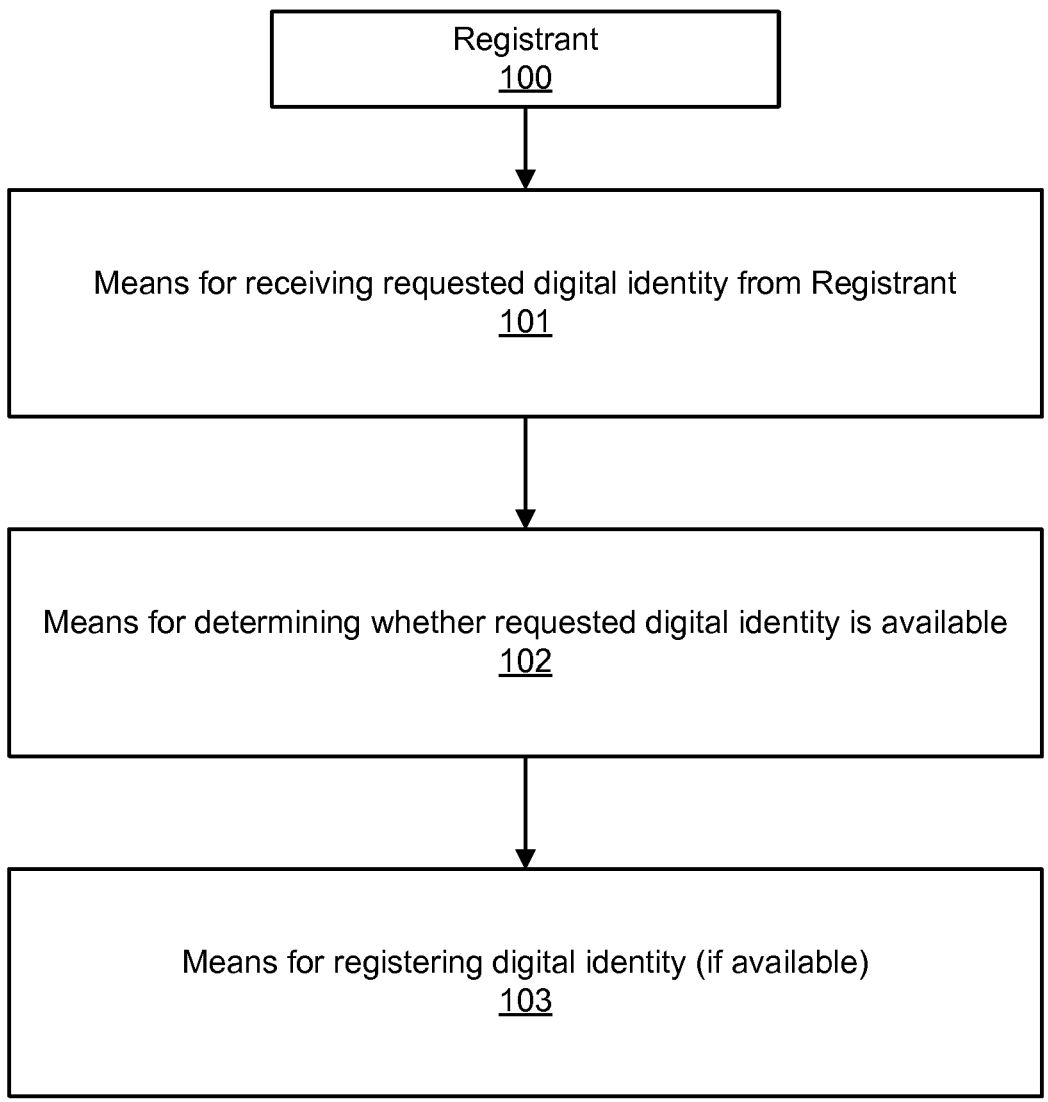
FIG. 1 illustrates a possible embodiment of a digital identity registration system.

The present invention will now be discussed in detail with regard to the attached drawing figures which were briefly described above. In the following description, numerous specific details are set forth illustrating the Applicants' best mode for practicing the invention and enabling one of ordinary skill in the art to make and use the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Digital Identity Registration

A streamlined example embodiment of a digital identity registration system is illustrated in FIG. 1. The illustrated embodiment includes means 101 for receiving a requested digital identity from a Registrant 100, means 102 for determining whether the digital identity is available, and means 103 for registering the digital identity, if available, to the Registrant 100. This embodiment places no limitation on the format of the requested digital identity. Thus, as non-limiting examples, a requested digital identity may be in the form of a piece of client software, a digital certificate, or a URL comprising any combination of characters—perhaps including a domain name that may be owned by the Registrant 100.

Figure 2:
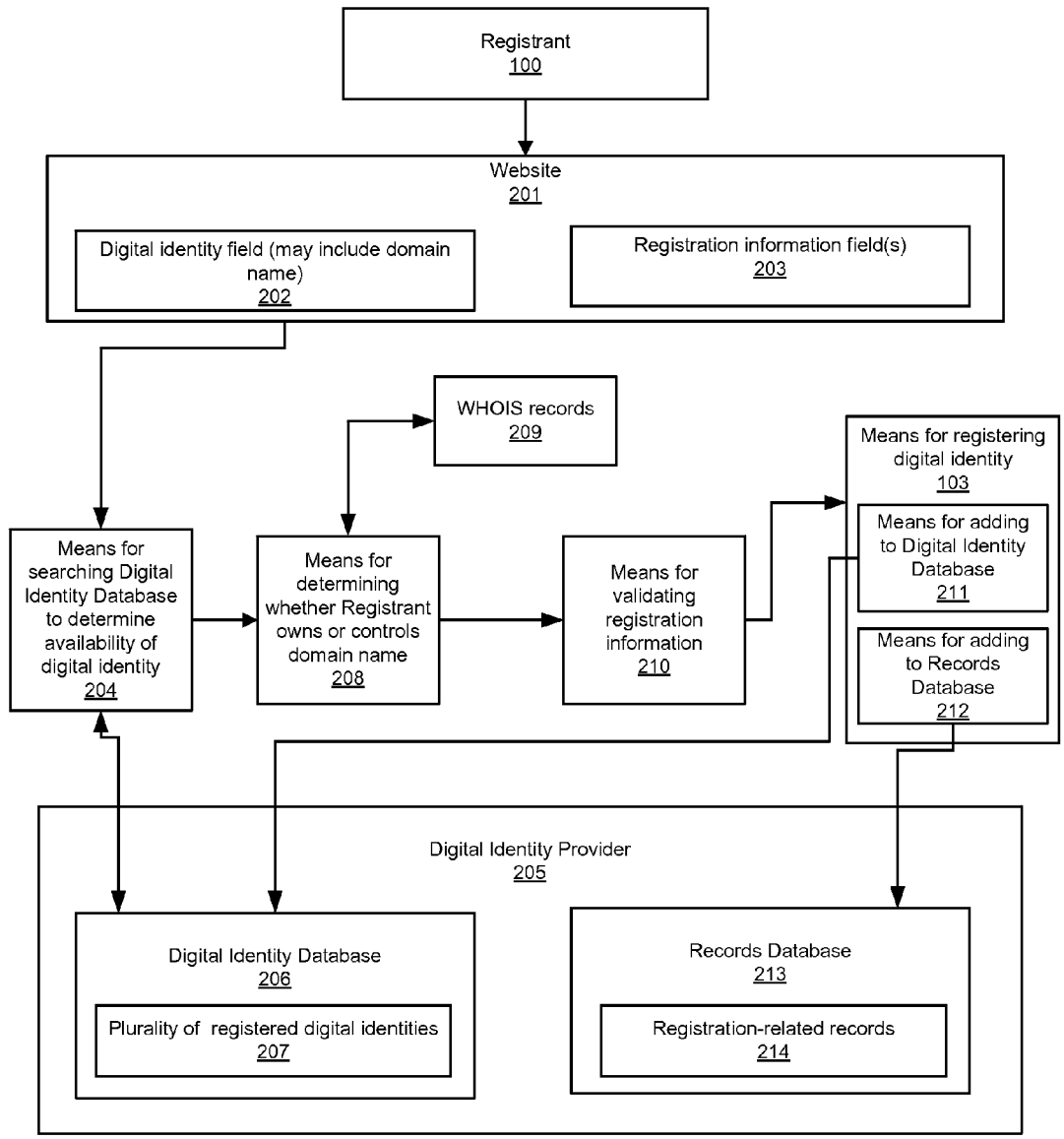
FIG. 2 illustrates a possible embodiment of a digital identity registration system.

A more detailed example embodiment of a digital identity registration system is illustrated in FIG. 2. The illustrated embodiment includes a Digital Identity Provider 205, a website 201, a Digital Identity Database 206, means 204 for searching the Digital Identity Database, WHOIS records 209, means 208 for searching WHOIS records 209, means 210 for validating registration information provided by the Registrant 100, means 211 for updating the Digital Identity Database 206, a Records Database 213, and means 212 for updating the Records Database 213. This embodiment places no limitation on the format of the requested digital identity. Thus, as non-limiting examples, a requested digital identity may be in the form of a piece of client software, a digital certificate, or a URL comprising any combination of characters—perhaps including a domain name that may be owned by the Registrant 100.

The Registrant 100 may be an individual or an entity including, but not limited to, a person, a business, a governmental institution, an educational institution, a non-profit organization, or a social organization. The website 201 may be hosted on a server owned or operated by a Digital Identity Provider 205, which may be a domain name Registrar, Registry, or Reseller. The website 201 may be accessible to any Internet user with Internet access. The website 201 may have a digital identity field 202 and a registration information field 203 in which a Registrant 100 may enter a requested digital identity and related registration information. The requested digital identity may comprise a piece of client software, a digital certificate, a URL comprising any combination of characters—perhaps including a domain name that may be owned by the Registrant 100, or another security token. The registration information could include, among other things, information about the requested digital identity, information about the Registrant 100, or information about a person, entity, name, address, telephone number, email address, URL, domain name, or website associated with the Registrant 100 of the requested digital identity. The information also may include an administrative contact, a technical contact, or an other contact associated with the Registrant 100 of the requested digital identity. The information also could comprise biometric identification data, non-limiting examples of which may include a photograph, voiceprint, fingerprint, retinal scan, and/or DNA data.

To determine whether the requested digital identity is available, the system may include means 204 for searching a Digital Identity Database 206—that may store a plurality of registered digital identities 207—for the availability of the requested digital identity. The Digital Identity Database 206 may be maintained by a Digital Identity Provider 205. As a non-limiting example, the Digital Identity Database 206 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or other storage device. The Digital Identity Database 206 search may be accomplished by a desktop, network, or online search engine. The Digital Identity Database 206 search may utilize uninformed, list, tree, graph, SQL, tradeoff based, informed, adversarial, constraint satisfaction, string, genetic, sorting, probabilistic, tabu, federated, minimax, or ternary search algorithms.

If the requested digital identity includes a domain name, the system may include means 208 for determining whether the Registrant 100 owns or controls the domain name, perhaps by searching WHOIS records. WHOIS records may be maintained by a Registry, a Registrar, and/or another party and are readily accessible over the Internet. WHOIS is a TCP-based query/response protocol that is widely used for querying these records to determine the owner of a domain name, an IP address, or an autonomous system number on the Internet. The WHOIS search may utilize either a command line interface or a web-based tool and either "thick" or "thin" lookups. "Thin" registries store a limited amount of information about a domain name, typically including: "Domain Name," "Registrar," "Whois Server," "Referral URL," "Name Server," "Status," "Updated Date," "Creation Date," "Expiration Date," etc. "Thick" registries also store Registrant, Administrative, Technical, and Billing contact information. The .info and .biz TLDs are "thick" while .com and .net TLDs are "thin." Registrars usually store detailed information about the domain names registered through them. Even though the WHOIS records are public, many registries and registrars limit access to the WHOIS data by automated solutions (i.e. —computer programs, scripts, "crawlers," etc.). This prevents copying substantial parts of the WHOIS records and potential use of this data for unsolicited email campaigns. Typically, a domain name Registry or Registrar may avoid such limitations. Additionally, for the domain names registered through a Registrar, the Registrar has access to the domain name registrations, renewals, transfers, expirations, etc. in real time. The instant embodiment is therefore particularly advantageous because the Digital Identity Provider 205 may also be a Registrar, Registry, or Reseller.

Said determining means 208 also may be performed with a lookup service, such as a quick, lightweight mechanism for obtaining data, possibly utilizing Lightweight Directory Access Protocol (LDAP) or similar protocols as are known in the art. Said determining means 208 also may comprise contacting the Registrant 100 (or another individual or entity) to confirm domain name ownership and/or control.

If the domain name is unregistered and available for registration, the system may include means for the Registrant 100 to purchase and/or register the domain name. The purchasing and registering means may comprise a website-enabled domain name purchase and registration system as is known in the art.

The system also may include means 210 for validating the registration information entered by the Registrant 100 in the registration information field 203 on the website 201. The means 210 for validating registration information are discussed in the "Digital Identity Validation" section below and elsewhere in this application.

The system also may include means 211 for adding the digital identity to the plurality of registered digital identities 207 stored in the Digital Identity Database 206. It may also comprise means 212 for adding the Registrant's 100 registration information to the registration-related records 214 stored in a Records Database 213. These means (211 and 212) therefore register the digital identity by updating these databases (206 and 213) to reflect the change in the newly-registered digital identities' registration status.

Figure 3:
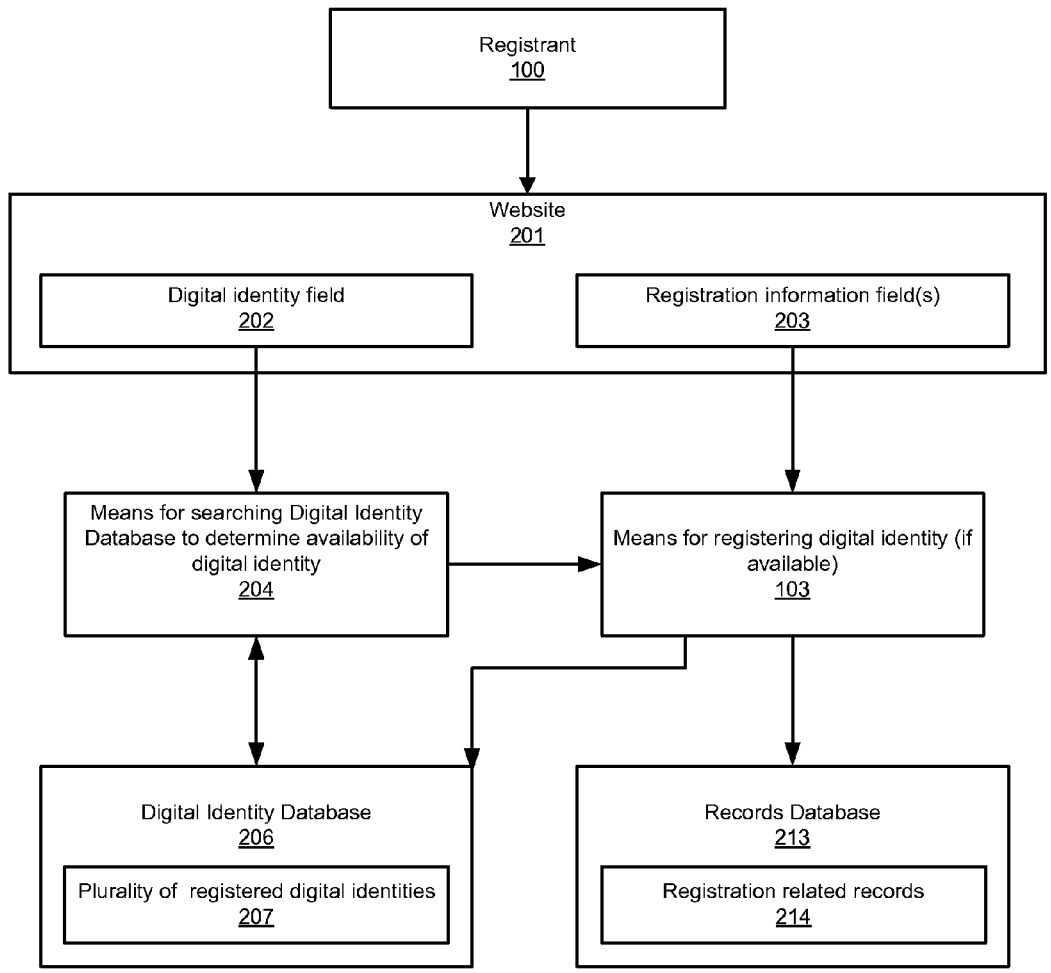
FIG. 3 illustrates a possible embodiment of a digital identity registration system.

Another example embodiment of a digital identity registration system is illustrated in FIG. 3. The illustrated embodiment includes a website 201, a Digital Identity Database 206, a Records Database 213, means 204 for searching the Digital Identity Database 206, and means 103 for registering a digital identity. In this embodiment, the website may have a digital identity field 202 and a registration information field 203 in which a Registrant 100 may enter a requested digital identity and related registration information. The means 204 for searching a Digital Identity Database 206, determines the availability of the digital identity entered in the digital identity field 202, perhaps by searching the Digital Identity Database 206, which stores a plurality of registered digital identities 207. The means 103 for registering the digital identity may add the digital identity to the Digital Identity Database 206 and add the registration information entered in the registration information field 203 by the Registrant 100 to the Records Database 213.

Figure 4:
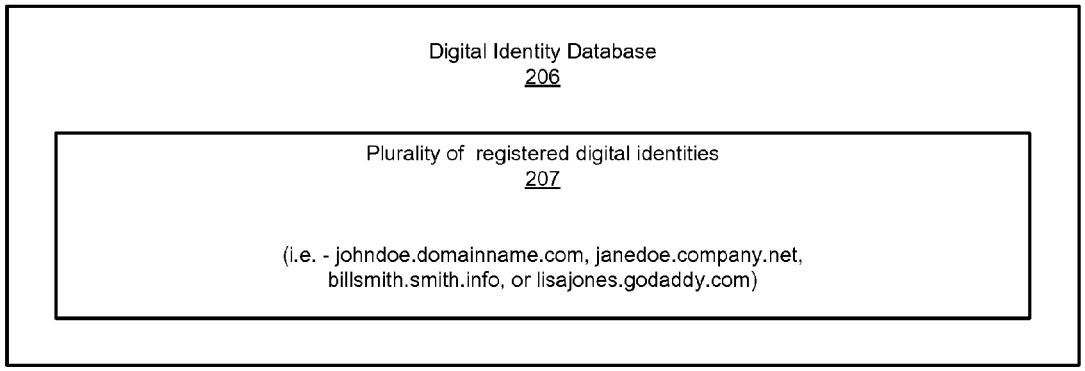
FIG. 4 illustrates a possible embodiment of a digital identity database and a records database.
Figure 4:
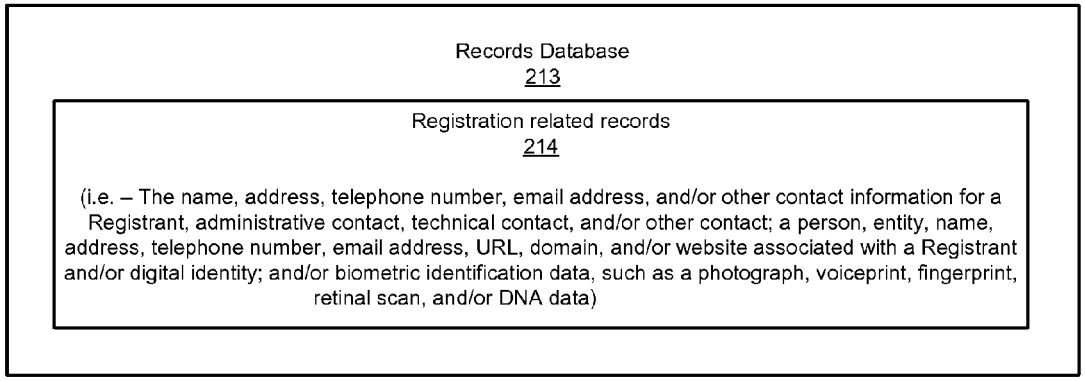

FIG. 4 illustrates a Digital Identity Database 206 that may store a plurality of registered digital identities 207. FIG. 4 also illustrates a Records Database 213 that may store registration related records 214, such as the name, address, telephone number, email address, and/or other contact information for a Registrant 100, administrative contact 800, technical contact 801, and/or other contact 802; a person, entity, name, address, telephone number, email address, URL, domain name, and/or website associated with a Registrant 100 and/or a digital identity; and/or biometric identification data, such as a photograph, voiceprint, fingerprint, retinal scan, and/or DNA data.

Figure 5:
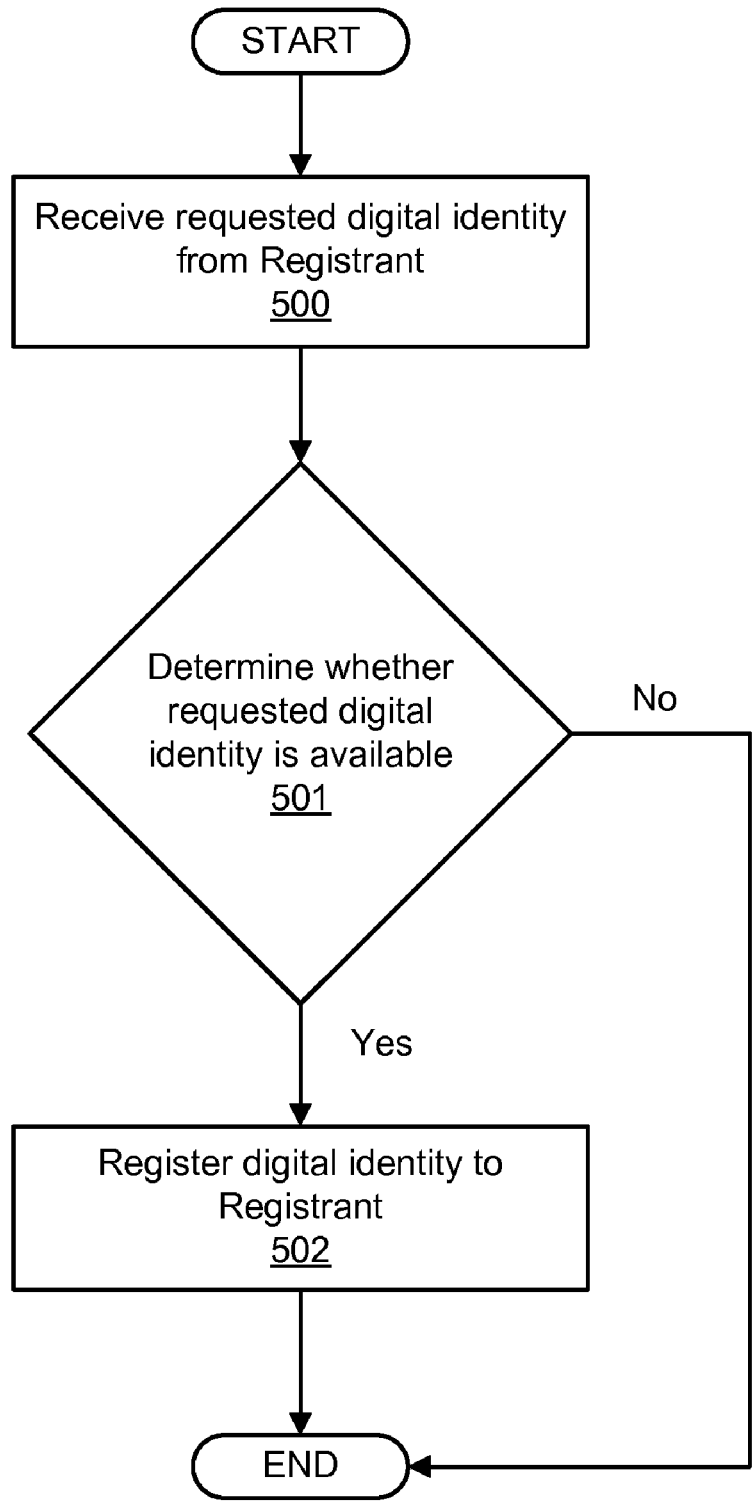
FIG. 5 is a flow diagram illustrating possible steps that may be taken with a digital identity registration system.

Several different methods may be used to register a digital identity. In a streamlined embodiment illustrated in FIG. 5, a requested digital identity may be received from a Registrant 100 (Step 500). The availability of the digital identity is then determined (Step 501). If the digital identity is unavailable, the process ends. If available, the digital identity is registered to the Registrant (Step 502).

Figure 6:
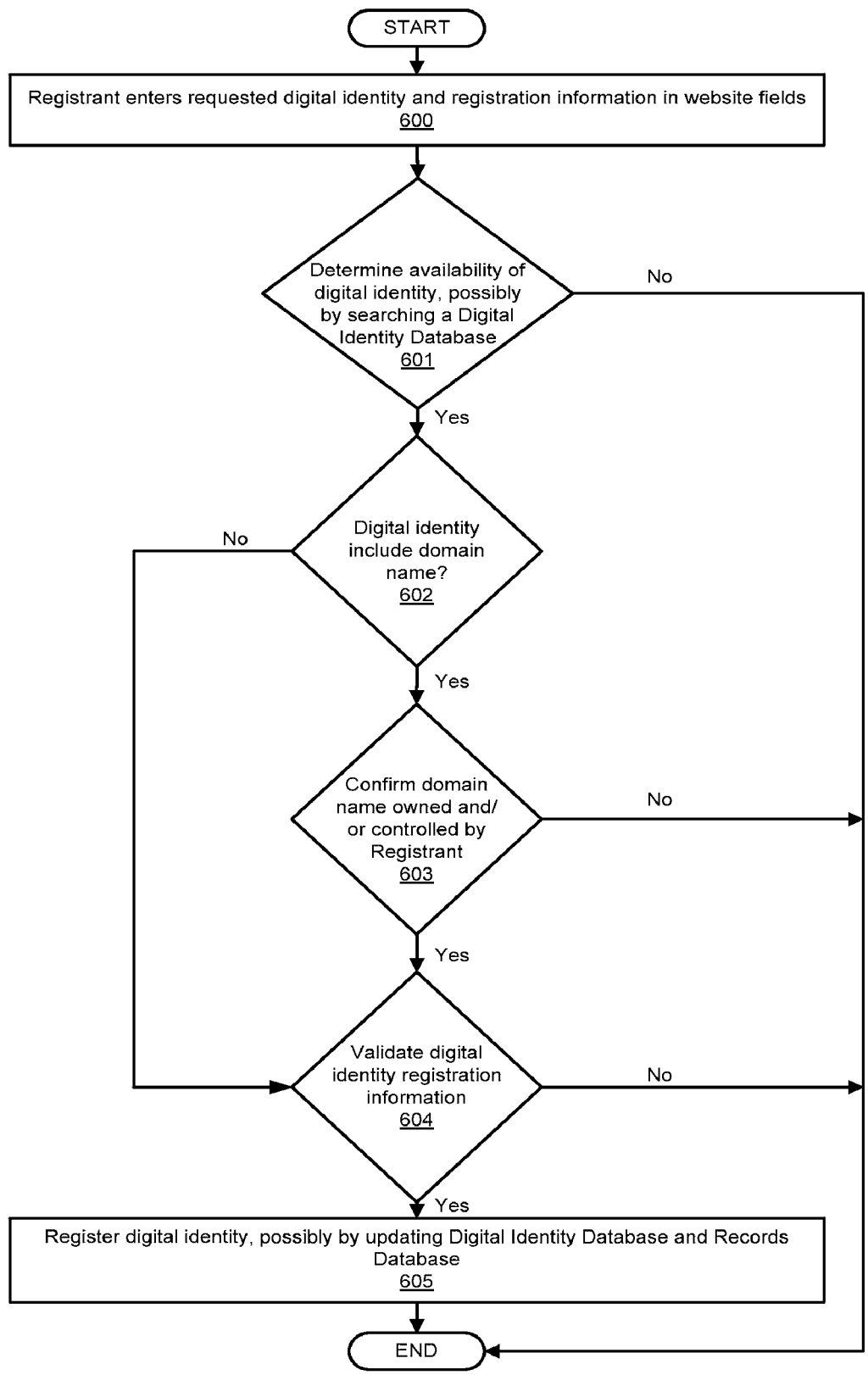
FIG. 6 is a flow diagram illustrating possible steps that may be taken with a digital identity registration system.

A more detailed example embodiment of a digital identity registration process is illustrated in FIG. 6. In this example embodiment, a Registrant 100 enters a requested digital identity (or perhaps identities) and registration information in data entry fields 202 and 203 on a website 201. (Step 600). The website 201 may be hosted by a Digital Identity Provider 205, which may be domain name Registrar, Registry, or Reseller. Next, the availability of the requested digital identity may be determined (Step 601). This may be accomplished by searching a Digital Identity Database 206—that may store a plurality of registered digital identities 207—for the availability of the requested domain name. If the digital identity is unavailable, the process may end.

In another embodiment, one or more alternate digital identities may be proposed to the Registrant 100. The alternate digital identities may be similar to (or otherwise based on) the requested digital identity. The Registrant 100 may then select an alternate digital identity for registration.

If the requested digital identity or alternate digital identity is available (Step 601), a next process step may include determining whether the digital identity contains a domain name (Step 602) and, if so, whether the domain name is owned or controlled by the Registrant. (Step 603). This may be accomplished by searching WHOIS records 209 for registration information regarding the domain name. This also may be accomplished with a lookup service, such as a quick, lightweight mechanism for obtaining data, possibly utilizing Lightweight Directory Access Protocol (LDAP) or similar protocols as are known in the art. It also may comprise contacting the Registrant 100 (or another individual or entity) to confirm domain name ownership and/or control.

If the domain name is not owned or controlled by the Registrant 100, the process may end. If the domain name is unregistered and available for registration, the process may include the Registrant 100 to purchase and/or register the domain name. If the Registrant 100 owns or controls the domain name, a next process step may include validating the registration information entered by the Registrant 100 in the registration information field 203 on the website 201 (Step 604). This may be accomplished as set forth in the "Digital Identity Validation" section below and elsewhere in this application. If the registration information is not validated, the process may end. If the registration information is validated, a next process step may include registering the digital identity to the Registrant (Step 605). This may be accomplished by adding the digital identity to the plurality of registered digital identities 207 stored in the Digital Identity Database 206 and by adding the Registrant's 100 registration information to the registration-related records 214 stored in a Records Database 213.

Digital Identity Validation

Figure 7:
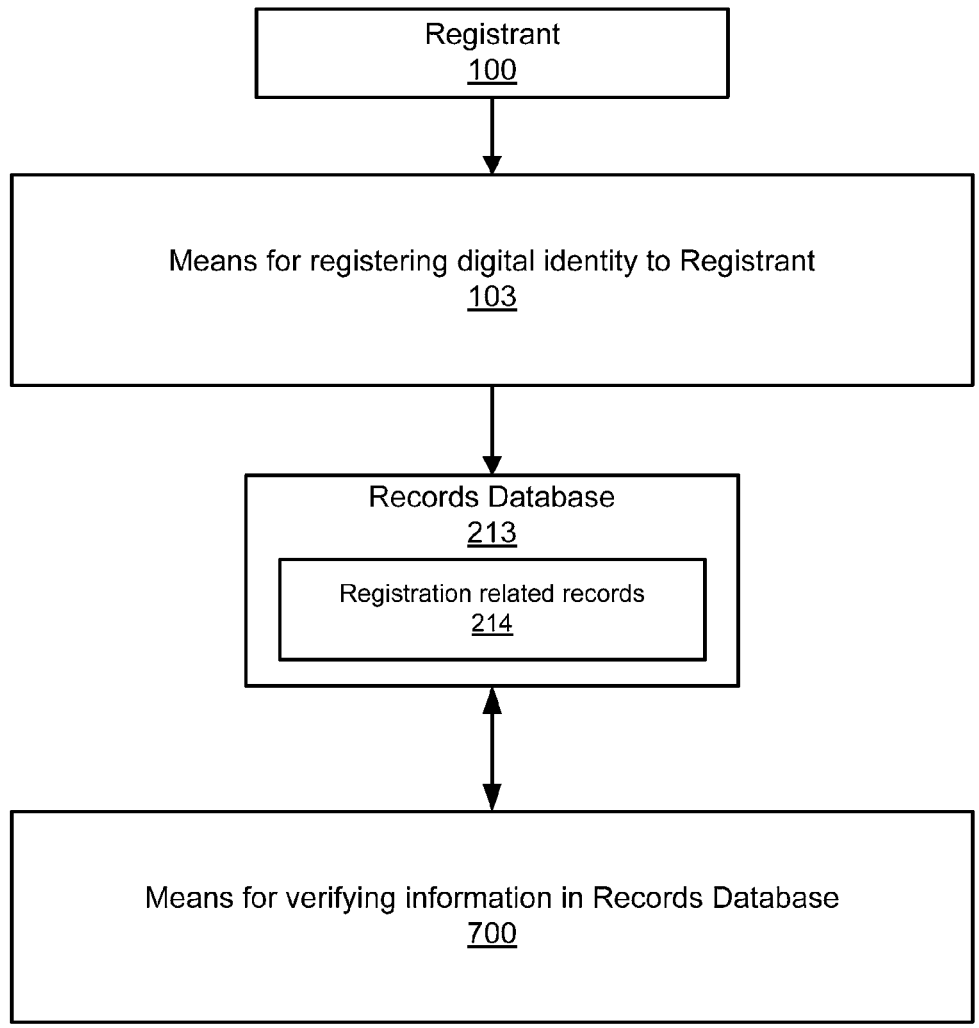
FIG. 7 illustrates a possible embodiment of a digital identity validation system.

A streamlined example embodiment of a digital identity validation system is illustrated in FIG. 7. The illustrated embodiment includes means 103 for registering a digital identity to a Registrant 100, a Records Database 213 for storing registration related records 214 (which may include information regarding the digital identity and/or the Registrant 100), and means 700 for verifying the information. This embodiment places no limitation on the format of the digital identity to be validated. Thus, as non-limiting examples, the subject digital identity may be in the form of a piece of client software, a digital certificate, or a URL comprising any combination of characters—perhaps including a domain name that may be owned by the Registrant 100.

Figure 8:
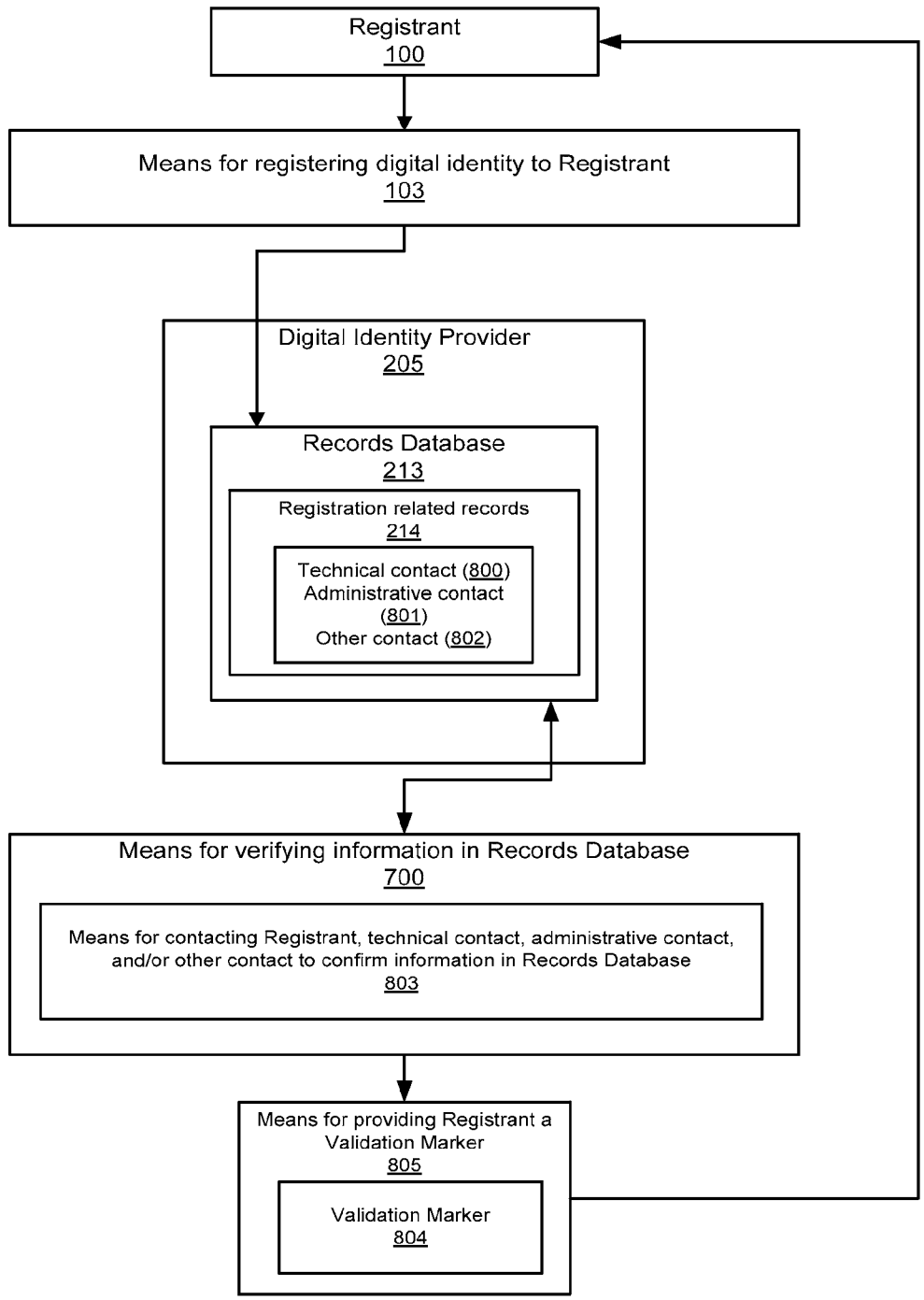
FIG. 8 illustrates a possible embodiment of a digital identity validation system.

A more detailed example embodiment of a digital identity validation system is illustrated in FIG. 8. The illustrated embodiment includes means 103 for registering a digital identity to a Registrant 100, a Digital Identity Provider 205, a Records Database 213 for storing registration related records 214 (which may include information regarding the digital identity, the Registrant 100, a technical contact 800, an administrative contact 801, and/or an other contact 802), means 700 for verifying the information in the Records Database 213, means 803 for contacting the Registrant 100, technical contact 800, administrative contact 801, and/or other contact 802 to confirm information in the Records Database 213, a Validation Marker 804, and means 805 for providing the Registrant 100 with a Validation Marker 804.

The Registrant 100 may be an individual or an entity including, but not limited to, a person, a business, a governmental institution, an educational institution, a non-profit organization, or a social organization. The means 103 for registering a digital identity to the Registrant 100 may include the systems and/or methods described in the "Digital Identity Registration" section above and elsewhere in this application. This embodiment places no limitation on the format of the digital identity to be validated. Thus, as non-limiting examples, a digital identity may be in the form of a piece of client software, a digital certificate, or a URL comprising any combination of characters—perhaps including a domain name that may be owned by the Registrant 100.

The instant embodiment also may include a Records Database 213, which may store registration related records 214. The registration related records 214 stored in the Records Database 214 may comprise information regarding a digital identity, Registrant 100, technical contact 800, administrative contact 801, or other contact 802, possibly including information regarding a person, entity, name, address, telephone number, URL, email address, domain name, and/or website associated with a digital identity or Registrant 100. The information may also include biometric identification data, non-limiting examples of which may include a photograph, voiceprint, fingerprint, retinal scan, and/or DNA data. The records 214 also could include a link or reference regarding a location of an additional registration record. As non-limiting examples, The Records Database 213 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or other storage device. The Records Database 213 may be maintained by a Digital Identity Provider 205, which may be a domain name Registry, Registrar, or Reseller, or another entity that provides digital identities.

To validate the origin and/or ownership of the subject digital identity, the instant embodiment may include means 700 for verifying at least some of the information in the Records Database 213. This validation may be accomplished by searching the Records Database 213 for at least some information and verifying the information with any person or entity. This search may be accomplished by a desktop, network, or online search engine and may utilize uninformed, list, tree, graph, SQL, tradeoff based, informed, adversarial, constraint satisfaction, string, genetic, sorting, probabilistic, tabu, federated, minimax, or ternary search algorithms.

As a non-limiting example, the verifying means 700 also may comprise means 803 for contacting the Registrant 100, technical contact 800, administrative contact 801, and/or other contact 802 to confirm at least some of the information in the Records Database 213. The verifying means 700 and/or the contacting means 803 could utilize an automated and/or manual process to contact the Registrant 100, technical contact 800, administrative contact 801, and/or other contact 802 to verify information. The manual and/or automated processes could be accomplished by a telephone call, email communication, written communication, and or other method of contact as is known in the art. For example, a Digital Identity Provider 205 employee may call, email, or write to the Registrant 100, technical contact 800, administrative contact 801, and/or other contact 802 and confirm that at least some of the information contained in the Records Database 213 is accurate. This function also could be performed by computer-implemented—or otherwise automated—processes, such as automated calling or email systems as are known in the art.

The verifying means 700 could also be accomplished by obtaining voice-recognition, visual, written, electronic, and/or biometric verification of at least some of the information in the Records Database. Biometric verification systems may include means for obtaining fingerprint, retinal, DNA, or other physical characteristic verification. In a biometric system that may be used, a Registrant 100 may provide one or more physical characteristics that may be processed by an algorithm to create a digital representation of the obtained biometric. The digital representation may then be entered into the Records Database 213. Verification requires the biometric of the user to be captured again, and processed into a digital template. That template may then be compared to the digital representation stored in the database to determine a match.

To provide the Registrant 100 with means to publicize his or her digital identity validation, the instant embodiment may include means 805 for providing the Registrant 100 with a Validation Marker 804. A Validation Marker 804 indicates that a digital identity has been validated and may be in the form of a displayable image, perhaps a digital certificate for display on a webpage. A Validation Marker 804 also may take the form of a change in appearance of the digital identity when it appears on a computer screen, possibly implemented by a piece of software that alters the digital identity's color, shape, or size. A Validation Marker 804 also could be an audible sound, such as an audio file that plays when the digital identity appears on a computer screen.

Means 805 for providing a Validation Marker 804 to a Registrant 100 include, but are not limited to: (1) sending a piece of software to the Registrant 100 (or other individual or entity) for installation on his computer, server, website, database, or other storage device; (2) storing the Validation Marker 804 on a computer, server, website, database, or other storage device from which the Registrant 100 (or other individual or entity) may retrieve said Validation Marker 804; or (3) sending the Validation Marker 804 to a third party for storage on a computer, server, website, database, or other storage device from which the Registrant 100 (or other individual or entity) may retrieve said Validation Marker 804.

Figure 9:
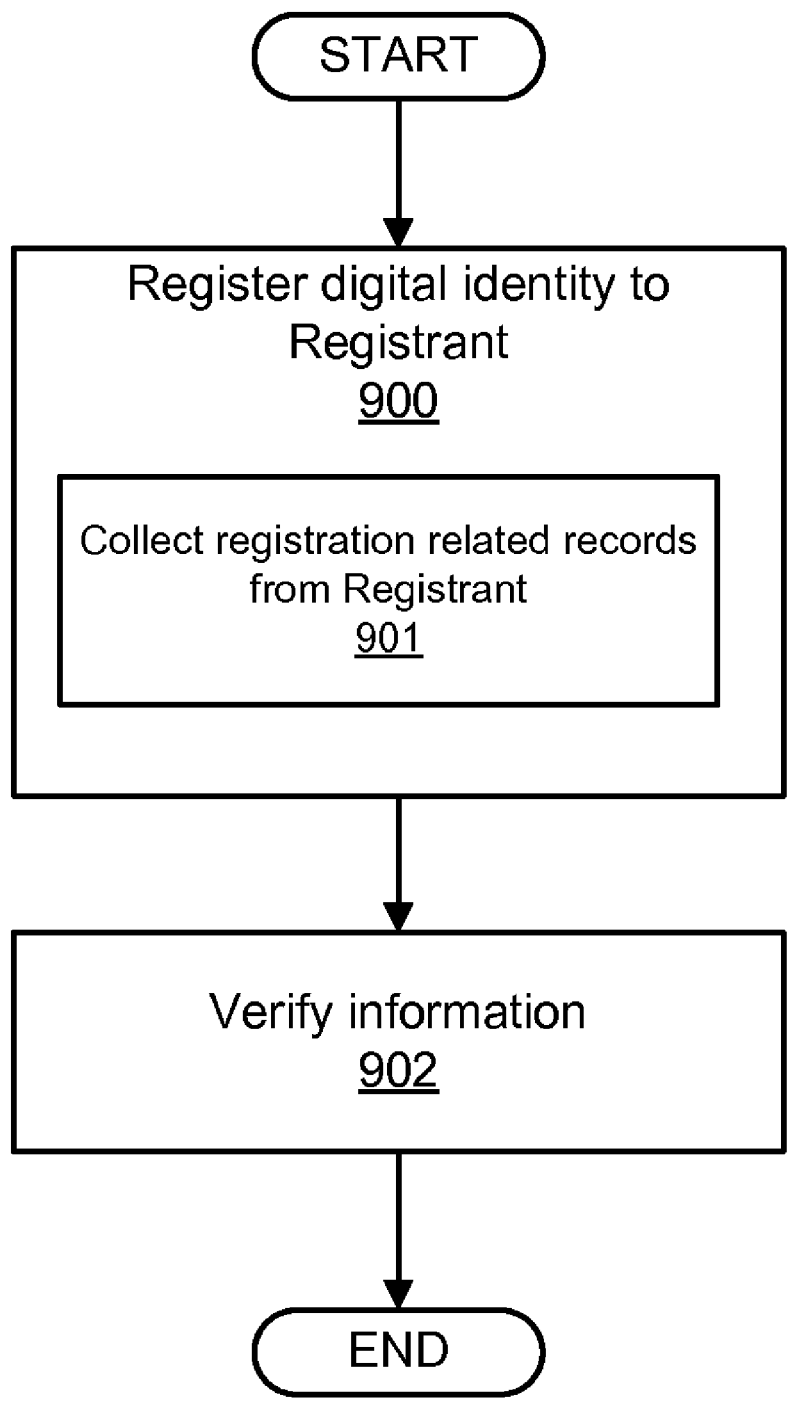
FIG. 9 is a flow diagram illustrating possible steps that may be taken with a digital identity validation system.

Several different methods may be used to validate a digital identity. In a streamlined embodiment illustrated in FIG. 9, a digital identity may be registered to a Registrant 100 (Step 900). During the registration process, one or more registration related records may be collected from the Registrant 100 (Step 901). At least some of the information collected from the Registrant 100 is then verified (Step 902).

Figure 10:
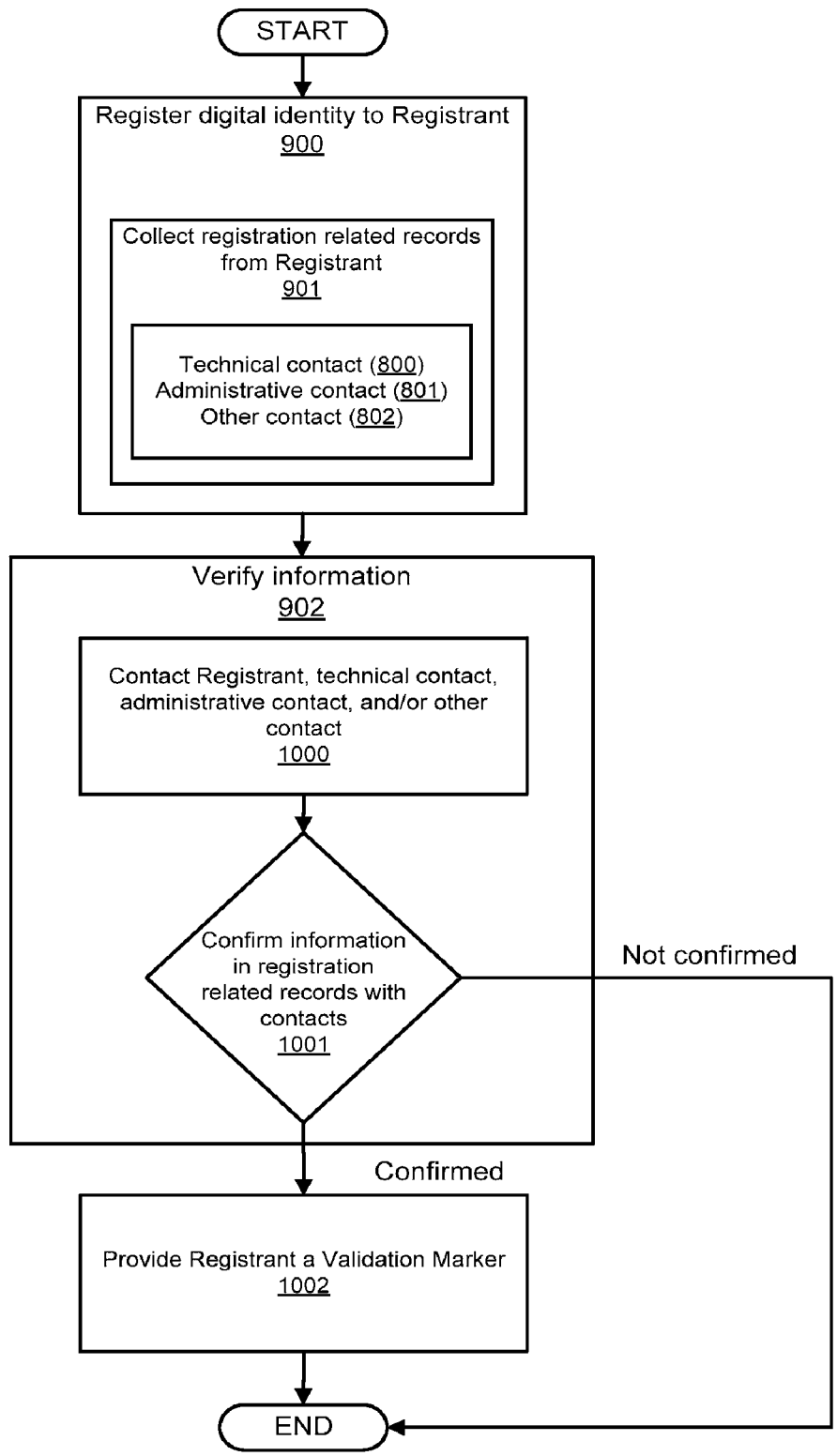
FIG. 10 is a flow diagram illustrating possible steps that may be taken with a digital identity validation system.

A more detailed example embodiment of a digital identity validation process is illustrated in FIG. 10. In this example embodiment, a digital identity may be registered to a Registrant 100 (Step 900). This step may be accomplished by any of the methods described in the "Digital Identity Registration" section above and elsewhere in this application. During the registration process, one or more registration related records 214 may be collected from the Registrant 100 (Step 901). The registration related records 214 may comprise information regarding a digital identity, Registrant 100, technical contact 800, administrative contact 801, or other contact 802, possibly including information regarding a person, entity, name, address, telephone number, URL, email address, domain name, and/or website associated with a digital identity or Registrant 100. The information may also include biometric identification data, non-limiting examples of which may include a photograph, voiceprint, fingerprint, retinal scan, and/or DNA data. The records 214 also could include a link or reference regarding a location of an additional registration record.

At least some of the information collected from the Registrant 100 is then verified (Step 902). The verification step (Step 902) may be accomplished by contacting the Registrant 100, technical contact 800, administrative contact 801, or other contact 802 (Step 1000) and confirming at least some of the information with the contacted person or entity (Step 1001). The verifying step (Step 902) and/or the contacting step (Step 1000) could utilize an automated and/or manual process to contact the Registrant 100, technical contact 800, administrative contact 801, and/or other contact 802 to verify information. The manual processes could be accomplished by a telephone call, email communication, written communication, and/or in-person contact. For example, a Digital Identity Provider 205 employee may call, email, write, or make personal contact with the Registrant 100, technical contact 800, administrative contact 801, and/or other contact 802 and confirm that at least some of the information is accurate. These functions also could be performed by a computer-implemented—or otherwise automated—process, such as automated calling or email systems as are known in the art.

Alternatively, the verification step (Step 902) may be accomplished by obtaining voice-recognition, visual, written, electronic, and/or biometric verification of at least some of the information in the Records Database 213. As a non-limiting example, during the digital identity registration process, a Registrant 100 may provide a photograph, voiceprint, fingerprint, retinal scan, DNA, and/or other biometric sample. The sample may be in the form of a document, audio file, data file, or other type of computer file. This information may then be processed by an algorithm to create a digital representation of the obtained biometric. The digital representation may then be entered into the Records Database 213. Verification requires the biometric of the user to be captured again, and processed into a digital template. That template may then be compared to the digital representation stored in the database to determine a match. If there is a match, the information is confirmed.

If the information is not confirmed, the process may end. If the information is confirmed, a next step may include providing the Registrant 100 with a Validation Marker 804 (Step 1002), which allows the Registrant 100 to publicize his or her digital identity validation. A Validation Marker 804 may be provided to a Registrant 100 by, among other methods: (1) sending a piece of software to the Registrant 100 (or other individual or entity) for installation on his computer, server, website, database, or other storage device; (2) storing the Validation Marker 804 on a computer, server, website, database, or other storage device from which the Registrant 100 (or other individual or entity) may retrieve said Validation Marker 804; or (3) sending the Validation Marker 804 to a third party for storage on a computer, server, website, database, or other storage device from which the Registrant 100 (or other individual or entity) may retrieve said Validation Marker 804.

Digital Identity Related Reputation Tracking and Publishing

For the purposes of this application, the Digital Identity Provider 205 may include one or more domain name Registries, Registrars, and/or Resellers, or another entity that provides digital identities. Digital identity related reputation data may include one or more values, ratings, or scores per a digital identity. The data may further include links or references to the locations (typically on a network) where such values, ratings, or scores may be found.

Figure 11:
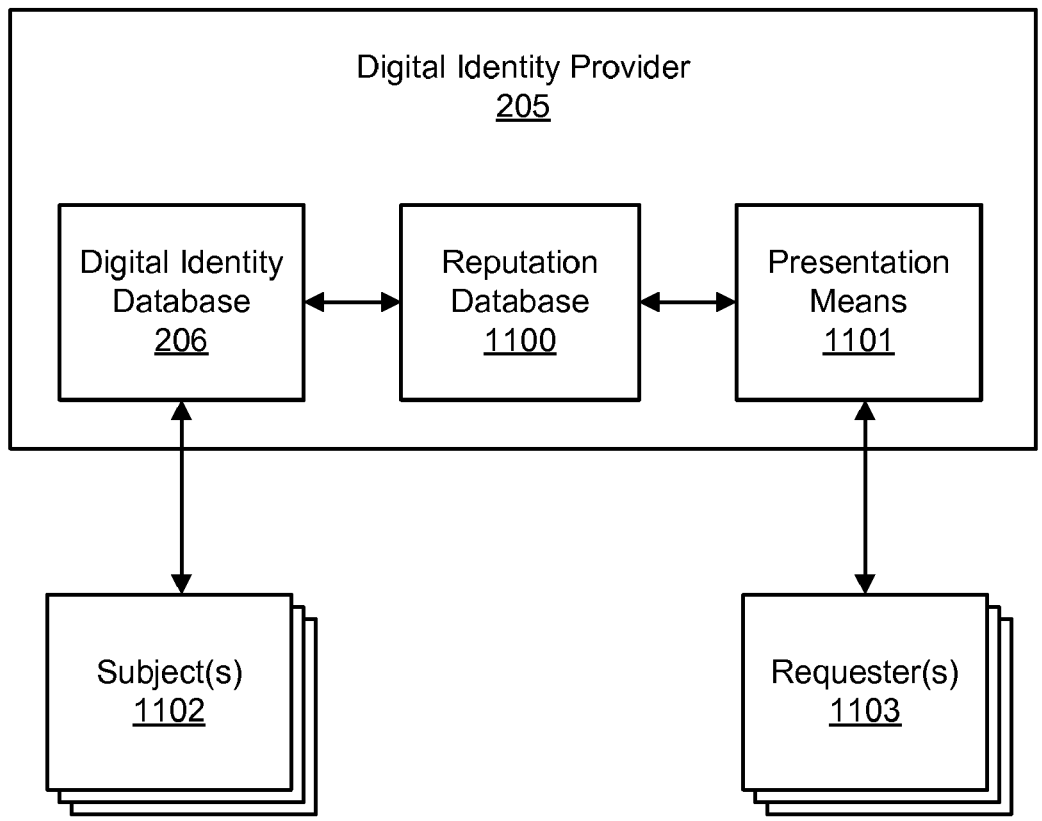
FIG. 11 illustrates a possible embodiment of a digital identity tracking and publication system.

An example embodiment of a digital identity related reputation tracking and publishing system is illustrated in FIG. 11. The illustrated embodiment includes a Digital Identity Provider 205, a Digital Identity Database 206, a Reputation Database 1100, a Presentation Means 1101, a Subject 1102, and a Requester 1103. The Digital Identity Provider 205 may be a domain name Registry, a Registrar of domain names, or a Reseller of a Registrar, or another entity that provides digital identities. The Digital Identity Provider 205 may be an accredited ICANN (Internet Corporation for Assigned Names and Numbers) Registry or Registrar. Examples of ICANN-accredited Registrars include GoDaddy.com, Wild West Domains, Blue Razor, etc. The Digital Identity Provider 205 may maintain the Digital Identity Database 206, which may contain one or more digital identities registered through or with the Digital Identity Provider 205. The Subject 1102 may be a person or an entity associated with one or more digital identities registered through the Digital Identity Provider 205.

The Subject 1102 may be a client of the Digital Identity Provider 205, a purchaser of products or services provided by the Digital Identity Provider 205, a user of the products or services provided by the Digital Identity Provider 205 (i.e. —email account users), a Registrant 100 of one or more digital identities registered through the Digital Identity Provider 205, a person or entity on record with the Digital Identity Provider 205 (i.e. —registration related records, billing records, technical and/or administrative records, etc.), a person or entity appearing in the WHOIS records for one or more domain names associated with a digital identity registered through the Digital Identity Provider 205, or any combination thereof. The system may include one or more Subjects. The system also may include one or more Digital Identity Providers 205. For simplification purposes, the system of FIG. 11 is described as having one Digital Identity Provider.

The products or services provided by the Digital Identity Provider 205 may include registering a digital identity or domain name, issuing a digital certificate, and/or providing an email or hosting service (accounts), computer software, website designing tools and/or services, reputation tracking service, or any combination thereof.

The Reputation Database 1100 may store digital identity related reputation data. There may be multiple records in the Reputation Database 1100 for a single digital identity from the Digital Identity Database 206. The Reputation Database 1100 may be maintained by the Digital Identity Provider 205, but also could be maintained by a third party. The Reputation Database 1100 may store reputation records for various categories associated with a digital identity. Such categories may include email practices, website content, privacy policies and practices, fraudulent activities, complaints, overall reputation, or any combination thereof. The overall reputation may be calculated from other reputation records using the sum, average, weighted, scaled, minimum, maximum, or any other formula. The reputation data may be tracked on a person or an entity, a digital identity, a domain name associated with a digital identity, a URL associated with a digital identity, an email address associated with a digital identity, a website associated with a digital identity, or any combination thereof.

The Reputation Database 1100 may store data regarding the amount of spam originating from an email address associated with a digital identity (per week, per month, per year, total, etc.), the number of complaints (about spam, phishing, and/or other fraudulent activities), or content of a website associated with a digital identity (illegal drugs, alcohol, tobacco, sex, pornography, nudity, or any other form of adult content, profanity, violence, intolerance, hate, racism, militant groups, extremists, Satanism, witchcraft, gambling, casino, spam, MLM, pyramid schemes, fraud, or any other illegal activity, etc.). The values in the reputation data may be numeric ratings or values out of a predetermined set of discrete values. Examples of sets of discrete values include: Yes-No, Bad-Fair-Good-Excellent, etc. The digital identity Registrant 100 reputation values may be calculated as minimum, maximum, average, weighted, scaled, sum, or any other formula from some or all digital identities with the same Registrant 100.

The Reputation Database 1100 may obtain various reputation data from other reputation services, such as SENDERBASE.ORG, BONDED SENDER PROGRAM, SPAMCOP, "societies" of trusted users, black and white domain/IP/email lists, CLOUDMARK, VERISIGN, VERIFIED DOMAINS LIST, TRUSTE, etc. The Reputation Database 1100 also may obtain various reputation data from individuals or entities that may submit such data to the Digital Identity Provider 205 for review, vetting, and publication. The variety of reputation data may aid in making better decisions by the Requester 1103.

Besides providing "raw" data in the Reputation Database 1100 for the Requester 1103 to make decisions, the Digital Identity Provider 205 may provide suggestions or recommendations if a particular digital identity, domain name, URL, email address, etc. should be trusted.

The Digital Identity Provider 205 may start tracking digital identity related reputation unilaterally, or after a request from the Subject 1102. The Digital Identity Provider 205 may offer the reputation tracking as an additional service to the Digital Identity Provider's clients.

The Requester 1103 may be a person, an entity, or a technological means, such as a computer software, website, web service, etc. The system may include one or more Requesters. The data from the Reputation Database 1100 may be provided to the Requester 1103 via the Presentation Means 1101.

The Presentation Means 1101 are means for presenting the data and may be maintained by the Digital Identity Provider 205 and may include DNS records, WHOIS records, a website, a web service, a computer software, an API-based solution or protocol, or any combination thereof. For example, the Digital Identity Provider 205 may post reputation values on a website, in the DNS or WHOIS records of a domain name associated with a digital identity, or post a URL link to the location on the network (i.e. —Internet website) where the reputation data may be found.

In another embodiment, the partners of the Digital Identity Provider 205 may have access to the Reputation Database 1100. The Presentation Means 1101 in this embodiment may include a system that periodically feeds reputation data to the partners. The reputation data may be in XML (eXtensible Markup Language), character-delimited (i.e. —CSV (Comma-Separated Values) or TSV (Tab Separated Values)), fixed length, or other formats.

The system of the present invention provides a framework, centralized around a Digital Identity Provider, for accessing the digital identity related reputation data. Any Internet or email user (or automated solutions) may find digital identity related reputation data through a Digital Identity Provider where the digital identity was registered or in other locations as specified above.

Figure 12:
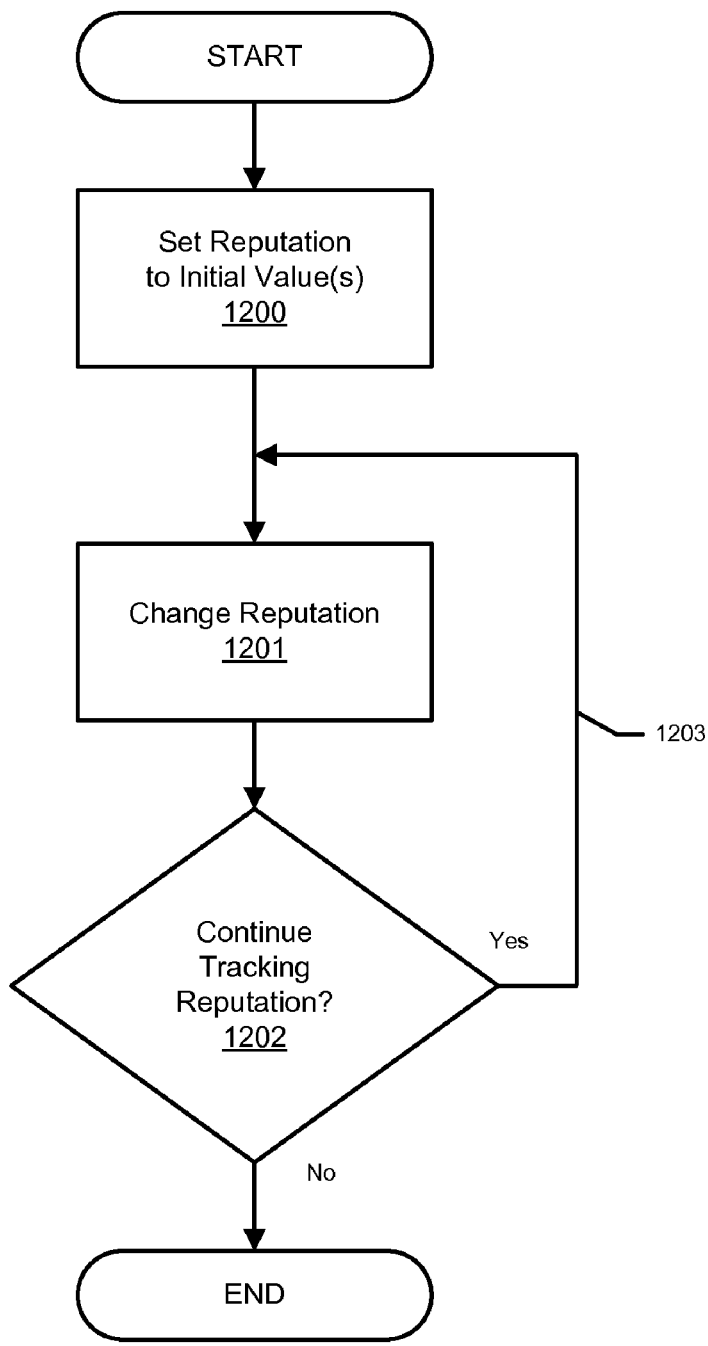
FIG. 12 is a flow diagram illustrating possible steps that may be taken with a digital identity tracking and publication system.

Several different methods may be used to track and publish digital identity related reputation. In an example embodiment illustrated in FIG. 12, a Digital Identity Provider 205 may set one or more values in digital identity related reputation data to initial values (Step 1200). The Digital Identity Provider 205 may change one or more values in domain name related reputation data (Step 1201). If it is desired to continue keeping track of the digital identity related reputation (Step 1202), Steps 1201 and 1202 may be repeated (Step 1203).

The initial values may be set to null, zero, or any other value. The values may be on various scales, for example from 0 to 100, from 0 to infinity, or from −100 to 100, where 0 may represent a digital identity with no reputation, etc. The Digital Identity Provider 205 may develop a schedule of points to be awarded for various events associated with the digital identity.

For example, if the Digital Identity Provider 205 receives a legitimate complaint about a spam email message associated with a digital identity, the email practices reputation rating (score, value) of the digital identity and the email address reputation rating may be reduced by one. If the digital identity exists for a year with no complaints, the digital identity's overall reputation rating may be raised by 10 points. If the Digital Identity Provider 205 validates the digital identity Registrant 100 contact information, the overall reputation rating may be raised by 20 points, etc. Additional points may be awarded if the digital identity is assigned an SSL certificate issued by a certification authority. The rating may be reduced if illegal content is present on a website associated with a digital identity. The ratings also may be adjusted so that more recent activities have a greater weight than older activities.

If circumstances require (i.e. —the digital identity is transferred from one Digital Identity Provider 205 to another, the Registrant 100 is changed, ownership of the digital identity is changed, registration related information changes, or if the digital identity expires), the ratings may be changed (i.e. —reset to their initial values). The Digital Identity Provider 205 may provide historical values of the reputation ratings.

Figure 14:
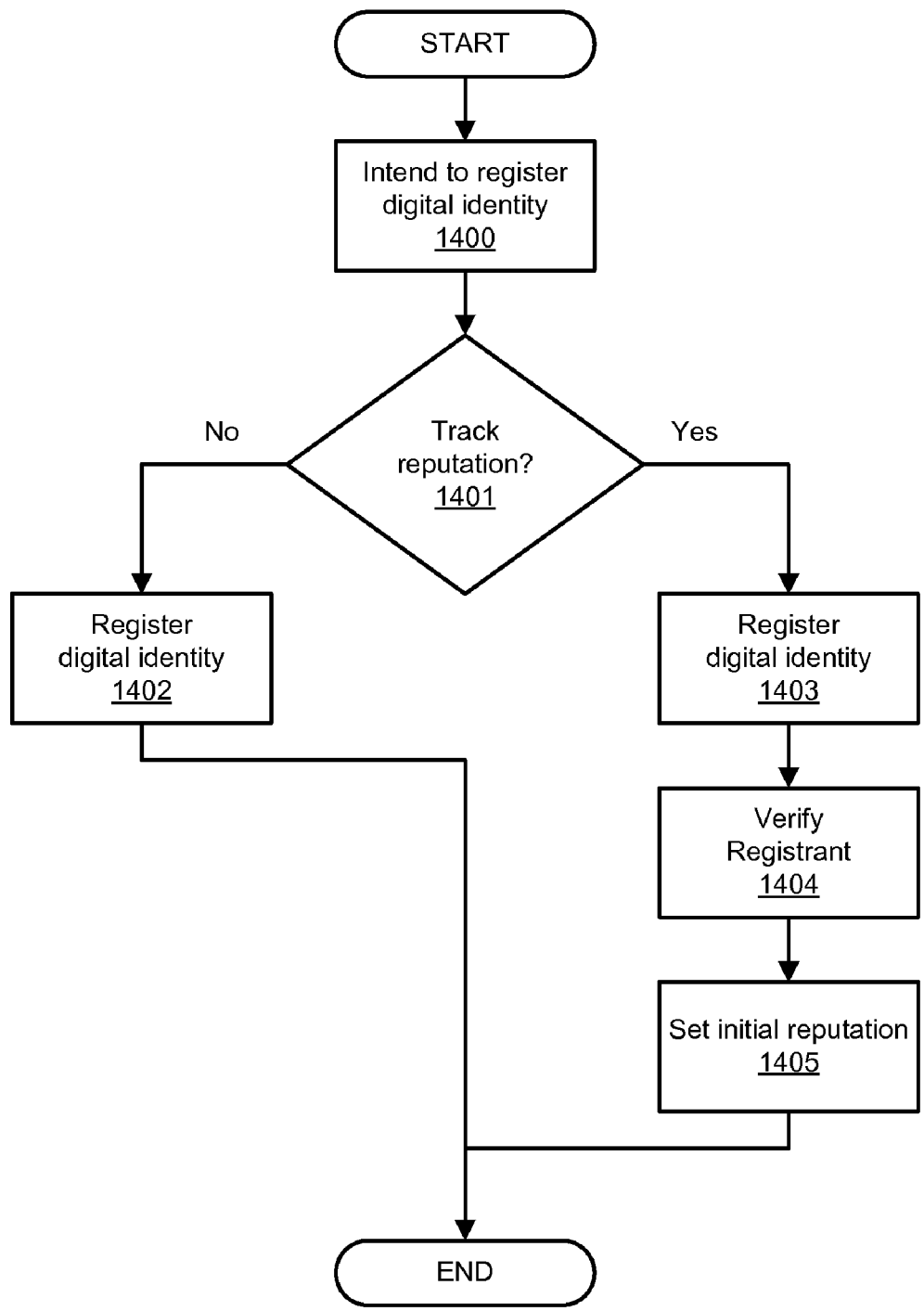
FIG. 14 is a flow diagram illustrating possible steps that may be taken with a digital identity tracking and publication system.

In another example embodiment of a digital identity tracking and publishing method, illustrated in FIG. 14, digital identity related reputation may be tracked from the point of initial registration (i.e. —point of sale). A Registrant 100, who intends to register a digital identity, may visit a Digital Identity Provider's 205 website (Step 1400). The Registrant 100 may be a person or entity that registers the digital identity. The Digital Identity Provider 205 may offer the Registrant 100 a reputation tracking service (Step 1401). The reputation tracking service may be free of charge for the Registrant 100 or may be a paid service. If the Registrant does not want the reputation tracking service, the Digital Identity Provider 205 may register the digital identity (Step 1402). If the Registrant 100 opts for the reputation tracking service, the Digital Identity Provider 205 may register the digital identity (Step 1403), may verify the registrant (Step 1404), and may set initial reputation values in reputation data (Step 1405).

As non-limiting examples, the verification step may be accomplished with the systems and/or methods described above in the "Digital Identity Validation" section, and elsewhere in this application. The validation step also may be accomplished by validating a Registrant's 100 business records, driver's licenses, or other documents. There may be multiple levels of verification performed. Basic levels may include validating basic contact information. Advanced levels may include verification of a variety of a Registrant's 100 registration information and/or documents. More extensive and comprehensive verification levels may result in higher reputation values (assuming the verification was successful).

In yet another embodiment, if the Registrant 100 does not opt for the reputation tracking service, the Digital Identity Provider 205 may still create reputation data for the digital identity and populate it with default values.

Figure 13:
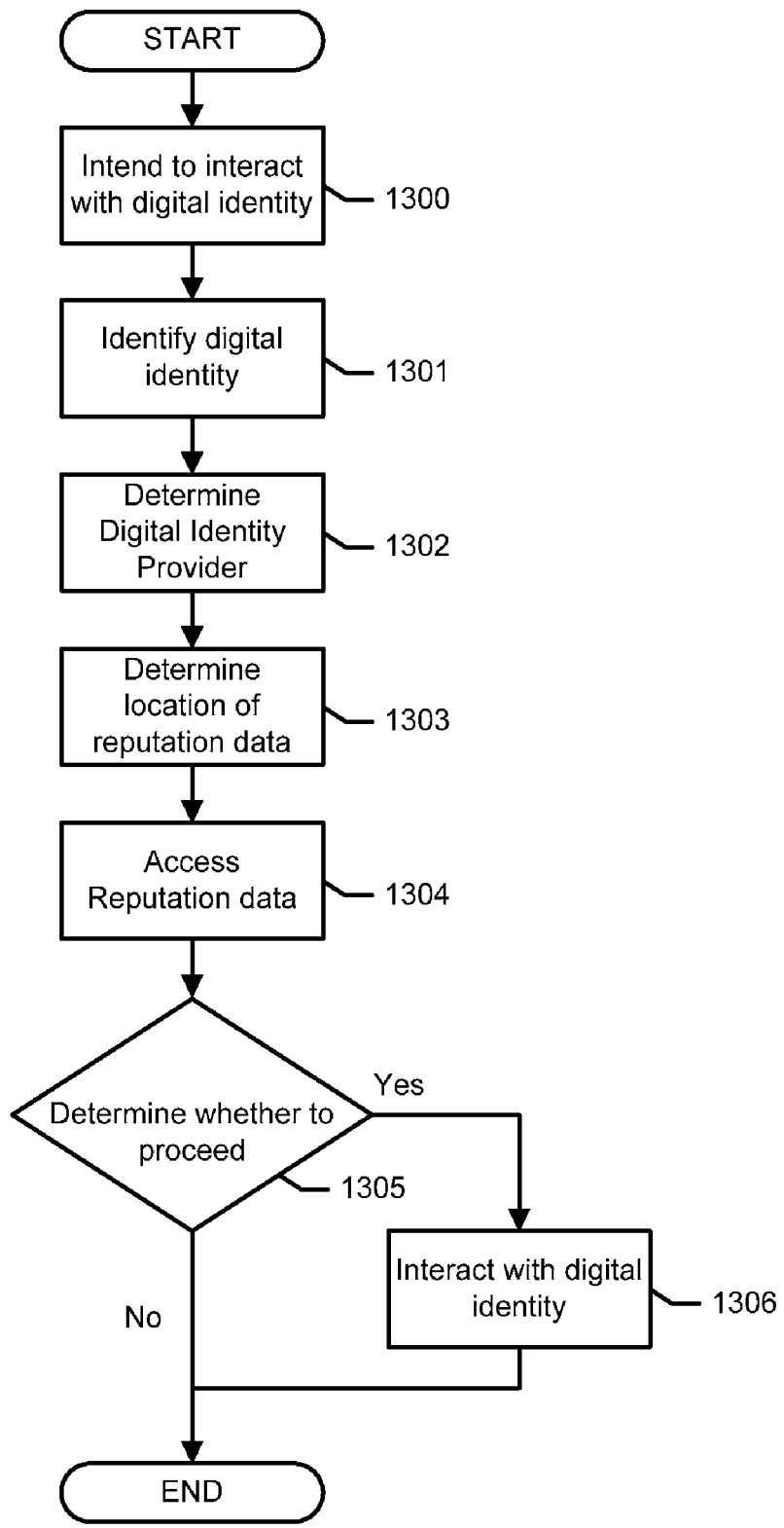
FIG. 13 is a flow diagram illustrating possible steps that may be taken with a digital identity tracking and publication system.

FIG. 13 illustrates a method for accessing digital identity related reputation data to determine whether to interact with a digital identity. The method includes the following steps. A Requester 1103 intends to interact online with a digital identity (Step 1300). The Requester 1103 identifies a digital identity (Step 1301). The Requester 1103 determines a Digital Identity Provider 205 of the digital identity (Step 1302). The Requester 1103 determines the location of digital identity related reputation data (Step 1303). The Requester 1103 accesses the digital identity related reputation data (Step 1304). Based on the digital identity related reputation data, the Requester 1103 decides (determines) whether to interact with the digital identity (Steps 1305 and 1306).

The Requester 1103 may be an individual or entity, but also could be a computer software running in conjunction with a server or a client program. If the Requester is a computer software, the intention to interact with a digital identity (Step 1300) may comprise a logic algorithm's determination to interact. The intention to interact (Step 1300) also may arise from an individual or entity's online encounter with a Subject's 1102 digital identity. Such an encounter could occur in an online social network or dating service, a website where a Subject 1102 offers an item for service or online sale, or where a Subject 1102 posts a comment or opinion on a website. For each of these applications, the Subject 1102 may be identified by his or her digital identity.

The Digital Identity Provider 205 for the Subject's 1102 digital identity may then be determined (Step 1302). The Digital Identity Provider 205 may be readily identifiable from the digital identity itself, an email, domain name, website, URL, or blog associated with the digital identity, or any other online encounter described in the previous paragraph. The Digital Identity Provider 205 also may be ascertained by a search of a Digital Identity Database 206 and/or Records Database 213 that may be made publicly available by a Digital Identity Provider 205 or another entity. If the digital identity comprises a domain name, the Digital Identity Provider 205 may be ascertained by a search of WHOIS records 209 or DNS records.

After the Digital Identity Provider 205 is determined (Step 1302), the location of the digital identity related reputation data may be determined (Step 1303). The location of the data may be, among other things, a database, a website, a web service, WHOIS records, DNS records, etc. The location of the digital identity related reputation data may be a predetermined location (i.e. —http://reputation.godaddy.com) or may be provided by a link or reference. The link or reference to the location may be, inter alia, a URL link, a DNS address, an IP address, a computer port, or any combination thereof The Requester 1103 may then access the reputation data (Step 1304), perhaps via a website, and decide (determine) whether the values in the digital identity related reputation data are appropriate to permit interaction with the digital identity. If the decision is made to interact, the Requester 1103 may proceed to email, communicate, sell, buy, date, or otherwise interact with the Subject's 1102 digital identity.

In this method the Requester may be computer software working in conjunction with an Internet browser. If the domain name and/or URL associated with the Subject's 1102 digital identity have a low reputation, the webpage located at the URL may be blocked. Alternatively, the computer software may give the Requester 1103 a warning that the domain name and/or the URL have a low reputation. The user may then decide whether to visit the URL. Each URL associated with a digital identity may have its own reputation rating. This is especially feasible when multiple parties are responsible for the content of a website associated with the domain name.

The Digital Identity Provider or another party may publish digital identity related reputation data in the DNS or WHOIS records 209. The reputation values (ratings, scores) or one or more URL links, where the reputation values can be found, may be published in the DNS or WHOIS records 209. The party that tries to access digital identity related reputation data may obtain it, inter alia, from a predetermined URL on the Internet or from the DNS or WHOIS records 209. One embodiment of the method for publishing digital identity related reputation in the WHOIS records 209 includes the following steps. The Digital Identity Provider 205 collects digital identity related information and forms digital identity related reputation data. Then, the Digital Identity Provider 205 stores the digital identity related reputation data in the WHOIS records 209.

In all of the above embodiments, the Digital Identity Database 206 and the Records Database 213 may be part of the same database, or separate databases. Similarly, they may be located on the same server or physically (and/or geographically) separated.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
   a) a website hosted on at least one server computer communicatively coupled to a computer network, said website comprising one or more fields configured to receive from a prospective registrant: (i) at least one digital identity comprising a domain name registered to said prospective registrant; and (ii) at least one registration information;
   b) a digital identity database on at least one of said at least one server computer, said digital identity database storing a plurality of registered digital identities;
   c) a records database on at least one of said at least one server computer, said records database storing at least one registration-related record for each of said plurality of registered digital identities;
   d) a search engine running on at least one of said at least one server computer, said search engine being configured to determine the availability of said at least one digital identity for registration by searching said digital identity database; and
   e) a digital identity registration software running on at least one of said at least one server computer, said digital identity registration software being configured to register said at least one digital identity, if determined to be available, to said prospective registrant by adding at least one of said at least one registration information to said records database and adding said digital identity to said digital identity database.

2. The system of claim 1, wherein said at least one digital identity comprises a subdomain concatenated to said domain name.

3. The system of claim 2, further comprising:
   f) means for confirming said domain name is owned or controlled by said prospective registrant.

4. The system of claim 3, wherein said digital identity database is maintained by a digital identity provider.

5. The system of claim 4, wherein said digital identity provider comprises a domain name registrar.

6. The system of claim 4, wherein said digital identity provider comprises a domain name registry.

7. The system of claim 4, wherein said digital identity provider comprises a reseller for a domain name registrar.

8. The system of claim 4, wherein said digital identity provider is not a domain name registry, registrar, or reseller.

9. The system of claim 3, further comprising:
   g) means for validating at least one of said at least one registration information prior to registering said at least one digital identity.

10. The system of claim 9, wherein said means for confirming said domain name is owned or controlled by said prospective registrant comprises means for searching WHOIS records.

11. A process, comprising the steps of:
    a) receiving, by at least one server computer communicatively coupled to a computer network, a request to register a digital identity comprising a domain name registered to a prospective registrant, said digital identity, and one or more registration information;
    b) determining, by at least one of said at least one server computer, the availability of said digital identity for registration by searching a digital identity database communicatively coupled to said computer network, said digital identity database comprising a plurality of registered digital identities; and
    c) registering, by at least one of said at least one server computer, said digital identity, if determined to be available, to said prospective registrant.

12. The process of claim 11, wherein said receiving step comprises receiving said request, said digital identity, and said one or more registration information via a website communicatively coupled to said computer network.

13. The process of claim 11, wherein said registering step comprises adding said one or more registration information to a records database and adding said digital identity to said digital identity database.

14. The process of claim 13, wherein said digital identity comprises a subdomain concatenated to said domain name.

15. The process of claim 13, further comprising the step of:
    d) confirming said domain name is owned or controlled by said prospective registrant prior to registering said digital identity.

16. The process of claim 15, further comprising the step of:
e) validating said one or more registration information from said prospective registrant prior to registering said digital identity.

17. The process of claim 15, wherein confirming said domain name is owned or controlled by said prospective registrant comprises searching WHOIS records.

18. The process of claim 15, wherein said digital identity database is maintained by a digital identity provider.

19. The process of claim 18, wherein said digital identity provider comprises a domain name registrar.

20. The process of claim 18, wherein said digital identity provider comprises a domain name registry.

21. The process of claim 18, wherein said digital identity provider comprises a reseller for a domain name registrar.

22. The process of claim 15, wherein confirming said domain name is owned or controlled by said prospective registrant comprises utilizing a lookup service.

23. The process of claim 11, further comprising the step of:
d) prior to step c) suggesting, by at least one of said at least one server computer, at least one alternate digital identity.

24. The process of claim 23, further comprising the step of:
e) registering, by at least one of said at least one server computer, said alternate digital identity, if selected, to said prospective registrant.

* * * * *